United States Patent
Koga et al.

(10) Patent No.: US 12,459,730 B2
(45) Date of Patent: *Nov. 4, 2025

(54) REFUSE VEHICLE WITH SPATIAL AWARENESS

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 338 days.

This patent is subject to a terminal disclaimer.

(21) Appl. No.: 18/107,733

(22) Filed: Feb. 9, 2023

(65) Prior Publication Data

US 2023/0184934 A1  Jun. 15, 2023

Related U.S. Application Data

(63) Continuation of application No. 17/232,367, filed on Apr. 16, 2021, now Pat. No. 11,630,201.

(Continued)

(51) Int. Cl.
*B65F 3/02* (2006.01)
*B60Q 1/50* (2006.01)
(Continued)

(52) U.S. Cl.
CPC ............... *B65F 3/02* (2013.01); *B60Q 1/525* (2013.01); *B60Q 5/006* (2013.01); *B60W 30/09* (2013.01);
(Continued)

(58) Field of Classification Search
None
See application file for complete search history.

(56) References Cited

U.S. PATENT DOCUMENTS

| 2,473,379 A | 6/1949 | Lindgren |
| 5,378,010 A | 1/1995 | Marino et al. |

(Continued)

FOREIGN PATENT DOCUMENTS

WO  WO-2018/235274 A1  12/2018

*Primary Examiner* — Daniel L Greene
(74) *Attorney, Agent, or Firm* — Foley & Lardner LLP

(57) ABSTRACT

A refuse vehicle comprising a chassis, a body assembly coupled to the chassis, the body assembly defining a refuse compartment, one or more sensors coupled to the body and configured to provide data relating to the presence of an obstacle within an area near the refuse vehicle, a controller configured to receive the data from the one or more sensors, determine, using an obstacle detector and the data, the presence of an obstacle within the area and initiate a control action, wherein the control action includes at least one of controlling the movement of the refuse vehicle, controlling the movement of a lift assembly attached to the body assembly, or generating an alert.

20 Claims, 22 Drawing Sheets

Related U.S. Application Data

(60) Provisional application No. 63/011,619, filed on Apr. 17, 2020.

(51) Int. Cl.
*B60Q 5/00* (2006.01)
*B60W 30/09* (2012.01)
*G01S 13/86* (2006.01)
*G01S 13/931* (2020.01)

(52) U.S. Cl.
CPC .......... *G01S 13/867* (2013.01); *G01S 13/931* (2013.01); *B60W 2520/06* (2013.01); *B60W 2554/4041* (2020.02); *B60W 2554/4042* (2020.02); *B60W 2554/4043* (2020.02); *B60W 2554/4044* (2020.02); *B65F 2003/0269* (2013.01); *B65F 2003/0279* (2013.01); *B65F 2210/168* (2013.01)

(56) References Cited

U.S. PATENT DOCUMENTS

| | | |
|---|---|---|
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,105,984 A | 8/2000 | Schmitz et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,390,758 B1 | 5/2002 | McNeilus et al. |
| 6,447,239 B2 | 9/2002 | Young et al. |
| 6,474,928 B1 | 11/2002 | Christenson |
| 6,516,914 B1 | 2/2003 | Andersen et al. |
| 6,565,305 B2 | 5/2003 | Schrafel |
| 6,757,597 B2 | 6/2004 | Yakes et al. |
| 6,885,920 B2 | 4/2005 | Yakes et al. |
| 7,070,382 B2 | 7/2006 | Pruteanu et al. |
| 7,164,977 B2 | 1/2007 | Yakes et al. |
| 7,277,782 B2 | 10/2007 | Yakes et al. |
| 7,284,943 B2 | 10/2007 | Pruteanu et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,448,460 B2 | 11/2008 | Morrow et al. |
| 7,520,354 B2 | 4/2009 | Morrow et al. |
| 7,556,468 B2 | 7/2009 | Grata |
| 7,559,735 B2 | 7/2009 | Pruteanu et al. |
| 7,689,332 B2 | 3/2010 | Yakes et al. |
| 7,711,460 B2 | 5/2010 | Yakes et al. |
| 7,848,857 B2 | 12/2010 | Nasr et al. |
| 7,878,750 B2 | 2/2011 | Zhou et al. |
| 7,931,103 B2 | 4/2011 | Morrow et al. |
| 8,000,850 B2 | 8/2011 | Nasr et al. |
| 8,139,109 B2 | 3/2012 | Schmiedel et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,561,735 B2 | 10/2013 | Morrow et al. |
| 8,807,613 B2 | 8/2014 | Howell et al. |
| 8,947,531 B2 | 2/2015 | Fischer et al. |
| 9,045,014 B1 | 6/2015 | Verhoff et al. |
| 9,174,686 B1 | 11/2015 | Oshkosh |
| 9,216,856 B2 | 12/2015 | Howell et al. |
| 9,387,985 B2 | 7/2016 | Gillmore et al. |
| 9,403,278 B1 | 8/2016 | Van Kampen et al. |
| 9,420,203 B2 | 8/2016 | Broggi et al. |
| 9,656,640 B1 | 5/2017 | Verhoff et al. |
| 9,707,869 B1 | 7/2017 | Messina et al. |
| 9,880,581 B2 | 1/2018 | Kuriakose et al. |
| 9,981,803 B2 | 5/2018 | Davis et al. |
| 10,196,205 B2 | 2/2019 | Betz et al. |
| D843,281 S | 3/2019 | Gander et al. |
| 10,414,067 B2 | 9/2019 | Datema et al. |
| 10,434,995 B2 | 10/2019 | Verhoff et al. |
| 10,457,533 B2 | 10/2019 | Puszkiewicz et al. |
| D871,283 S | 12/2019 | Gander et al. |
| 10,558,234 B2 | 2/2020 | Kuriakose et al. |
| 10,594,991 B1 | 3/2020 | Skolnick |
| 10,633,180 B2 | 4/2020 | Salinas et al. |
| 10,633,181 B2 | 4/2020 | Butcher et al. |
| D888,629 S | 6/2020 | Gander et al. |
| 10,781,090 B2 | 9/2020 | Puszkiewicz et al. |
| 10,800,605 B2 | 10/2020 | Rocholl et al. |
| 10,843,379 B2 | 11/2020 | Rocholl et al. |
| 10,858,184 B2 | 12/2020 | Betz et al. |
| 10,859,167 B2 | 12/2020 | Jax et al. |
| D907,544 S | 1/2021 | Wall et al. |
| 10,899,538 B2 | 1/2021 | Nelson et al. |
| D909,934 S | 2/2021 | Gander et al. |
| 10,987,829 B2 | 4/2021 | Datema et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,021,078 B2 | 6/2021 | Rocholl et al. |
| 11,042,750 B2 | 6/2021 | Wildgrube et al. |
| 11,059,436 B2 | 7/2021 | Wildgrube et al. |
| 2002/0017412 A1 | 2/2002 | Pietsch et al. |
| 2003/0098786 A1 | 5/2003 | Bishop |
| 2003/0169213 A1 | 9/2003 | Spero |
| 2006/0152351 A1 | 7/2006 | Daura Luna et al. |
| 2006/0215020 A1 | 9/2006 | Mori et al. |
| 2008/0122597 A1 | 5/2008 | Englander |
| 2009/0108065 A1 | 4/2009 | King et al. |
| 2010/0114405 A1* | 5/2010 | Elston ................. B66F 9/07509 701/1 |
| 2012/0245798 A1 | 9/2012 | Coats et al. |
| 2013/0245822 A1 | 9/2013 | Kawanami et al. |
| 2013/0293712 A1 | 11/2013 | Turner et al. |
| 2017/0313262 A1 | 11/2017 | Wisnia et al. |
| 2019/0185077 A1 | 6/2019 | Smith et al. |
| 2019/0193934 A1 | 6/2019 | Rocholl et al. |
| 2019/0241124 A1 | 8/2019 | Izumikawa et al. |
| 2019/0265703 A1 | 8/2019 | Hicok et al. |
| 2019/0340909 A1 | 11/2019 | Nguyen et al. |
| 2019/0344475 A1 | 11/2019 | Datema et al. |
| 2019/0351883 A1 | 11/2019 | Verhoff et al. |
| 2020/0262328 A1 | 8/2020 | Nelson et al. |
| 2020/0262366 A1 | 8/2020 | Wildgrube et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0348681 A1 | 11/2020 | Clifton et al. |
| 2020/0348764 A1 | 11/2020 | Clifton et al. |
| 2020/0369468 A1 | 11/2020 | Searle et al. |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |

(56) References Cited

U.S. PATENT DOCUMENTS

| | | |
|---|---|---|
| 2020/0398772 A1 | 12/2020 | Wildgrube et al. |
| 2020/0398857 A1 | 12/2020 | Clifton et al. |
| 2020/0399057 A1 | 12/2020 | Rocholl et al. |
| 2020/0399058 A1 | 12/2020 | Rocholl et al. |
| 2021/0002112 A1 | 1/2021 | Puszkiewicz et al. |
| 2021/0024068 A1* | 1/2021 | Lacaze ................ G05D 1/0088 |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0086991 A1 | 3/2021 | Betz et al. |
| 2021/0192234 A1 | 6/2021 | Chen et al. |
| 2021/0221216 A1 | 7/2021 | Yakes et al. |
| 2021/0229908 A1 | 7/2021 | Rocholl et al. |
| 2022/0001800 A1 | 1/2022 | Singh |

\* cited by examiner

REFUSE VEHICLE WITH SPATIAL AWARENESS

CROSS-REFERENCE TO RELATED PATENT APPLICATIONS

This application is a continuation of U.S. patent application Ser. No. 17/232,367, filed Apr. 16, 2021, now U.S. Pat. No. 11,630,201, which claims the benefit of and priority to U.S. Provisional Patent Application No. 63/011,619, filed Apr. 17, 2020, both of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment of the present disclosure relates to refuse vehicle, comprising a chassis, a body assembly coupled to the chassis, the body assembly defining a refuse compartment, one or more sensors coupled to the body and configured to provide data relating to the presence of an obstacle within an area near the refuse vehicle, and a controller configured to receive the data from the one or more sensors, determine, using an obstacle detector and the data, the presence of an obstacle within the area, and initiate a control action, wherein the control action includes at least one of controlling the movement of the refuse vehicle, controlling the movement of a lift assembly attached to the body assembly, or generating an alert.

Another implementation of the present disclosure relates to a refuse vehicle comprising a chassis, a body assembly coupled to the chassis, the body assembly defining a refuse compartment, one or more sensors coupled to the body assembly and configured to provide data relating to the presence of an obstacle within a defined proximity of the refuse vehicle, wherein the defined proximity of the refuse vehicle is a portion of area around the refuse vehicle that cannot be seen by an operator of the refuse vehicle, and a controller configured to receive the data from the one or more sensors, determine, using an obstacle detector and the data, the presence and at least one of a position, a speed, or a direction of travel of an obstacle within the blind spot, and initiate a control action based on at least one of the presence, position, speed, or direction of travel of the obstacle, wherein the control action includes at least one of controlling the movement of the refuse vehicle, controlling the movement of a lift assembly attached to the body assembly, or generating an alert.

Yet another implementation of the present disclosure relates to a refuse vehicle comprising a chassis, a body assembly coupled to the chassis, the body assembly defining a refuse compartment, one or more sensors coupled to the body and configured to provide data relating to the presence of an obstacle within a defined proximity of the refuse vehicle, wherein the defined proximity of the refuse vehicle is a portion of area around the refuse vehicle that cannot be seen by an operator of the refuse vehicle and a controller configured to receive the data from the one or more sensors, determine, using an obstacle detector and the data, the presence and at least one of a position, a speed, or a direction of travel of an obstacle within the defined proximity of the refuse vehicle, classify, based on an output of the obstacle detector, the obstacle based on a determination regarding at least one of a position, speed, or direction of travel of the obstacle, associate a risk with the obstacle, the risk based on a determination regarding at least one of the position, speed, or direction of travel of the obstacle, generate, based on at least one of the presence, position, class, or the risk associated with the obstacle an alert, and initiate a control action based on at least one of the presence, position, speed, or direction of travel of the obstacle, wherein the control action includes at least one of controlling the movement of the refuse vehicle or controlling the movement of the lift assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a spatial awareness system configured to detect obstacles around the vehicle. The system includes various sensors and cameras positioned on the vehicle to provide the system with data necessary to determine the presence and/or the motion of an obstacle. The sensors detect obstacles around the vehicle and within operator blind spots. The system provides alerts based on the detected obstacles. The alerts may notify the operator of the detected obstacle and/or the obstacle of the vehicle.

Overall Vehicle

Figure 1A:
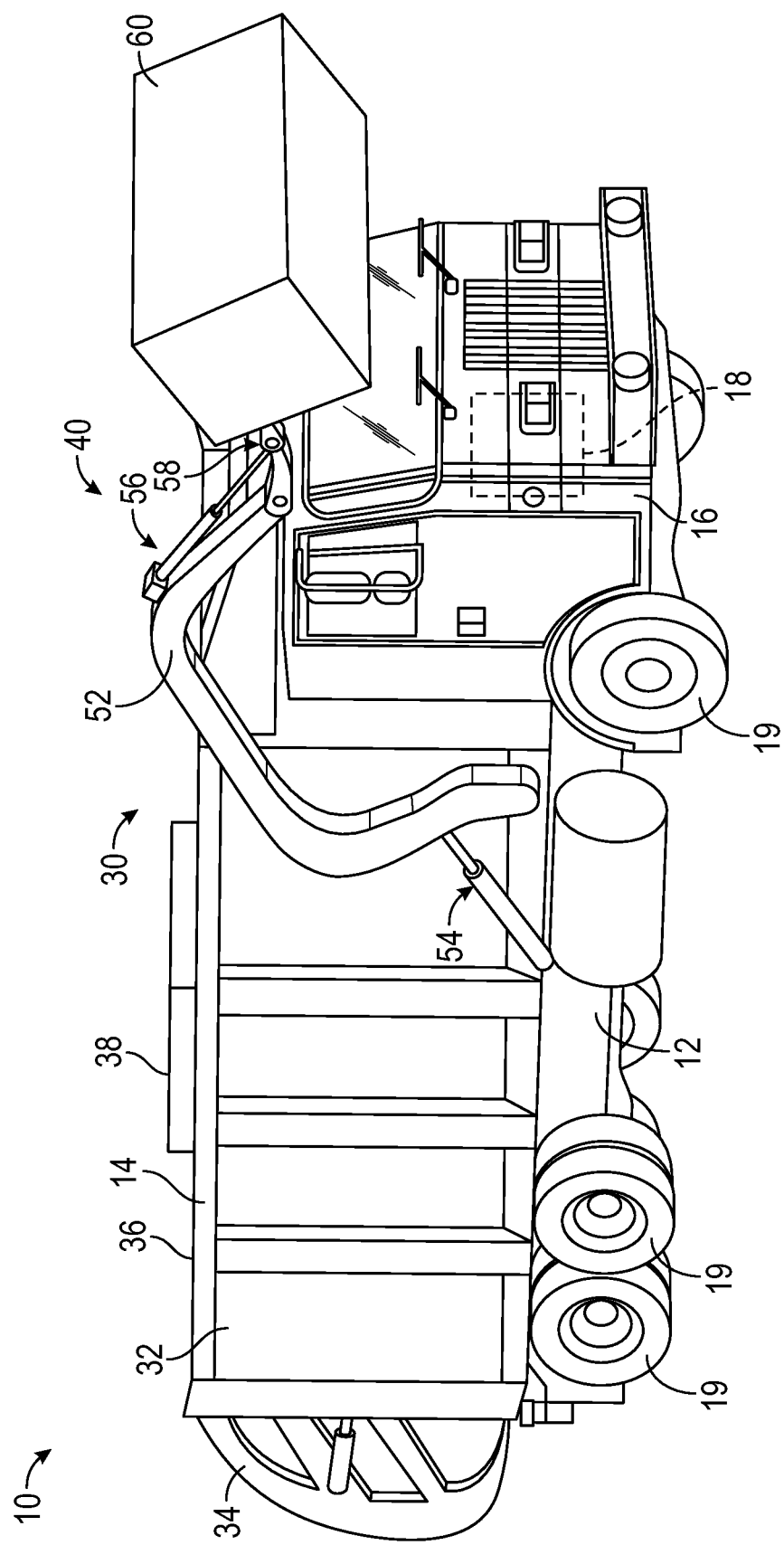
FIGS. 1A-1C are perspective views of a refuse vehicle, according to some embodiments.
Figure 1B:
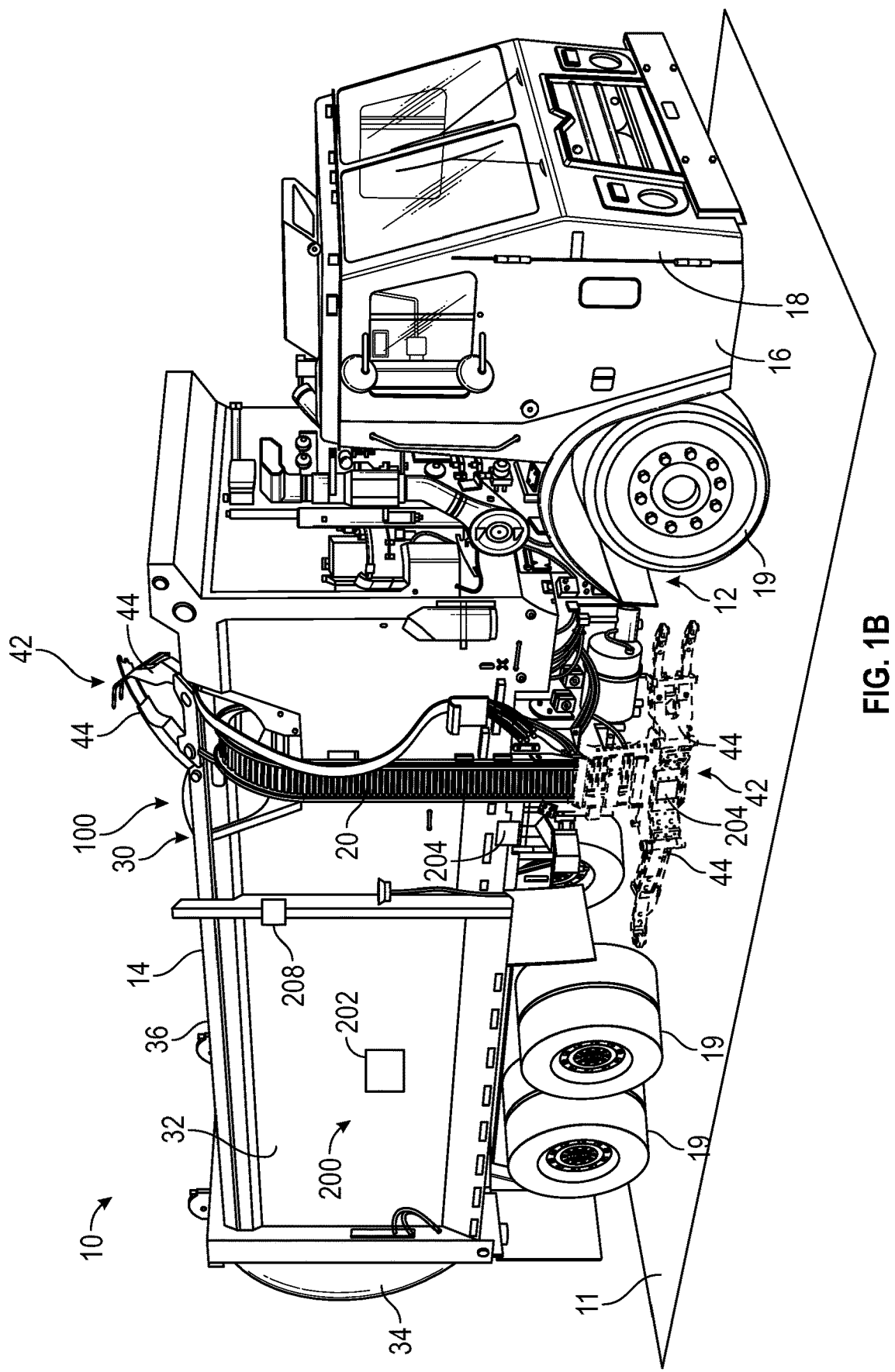
Figure 1C:
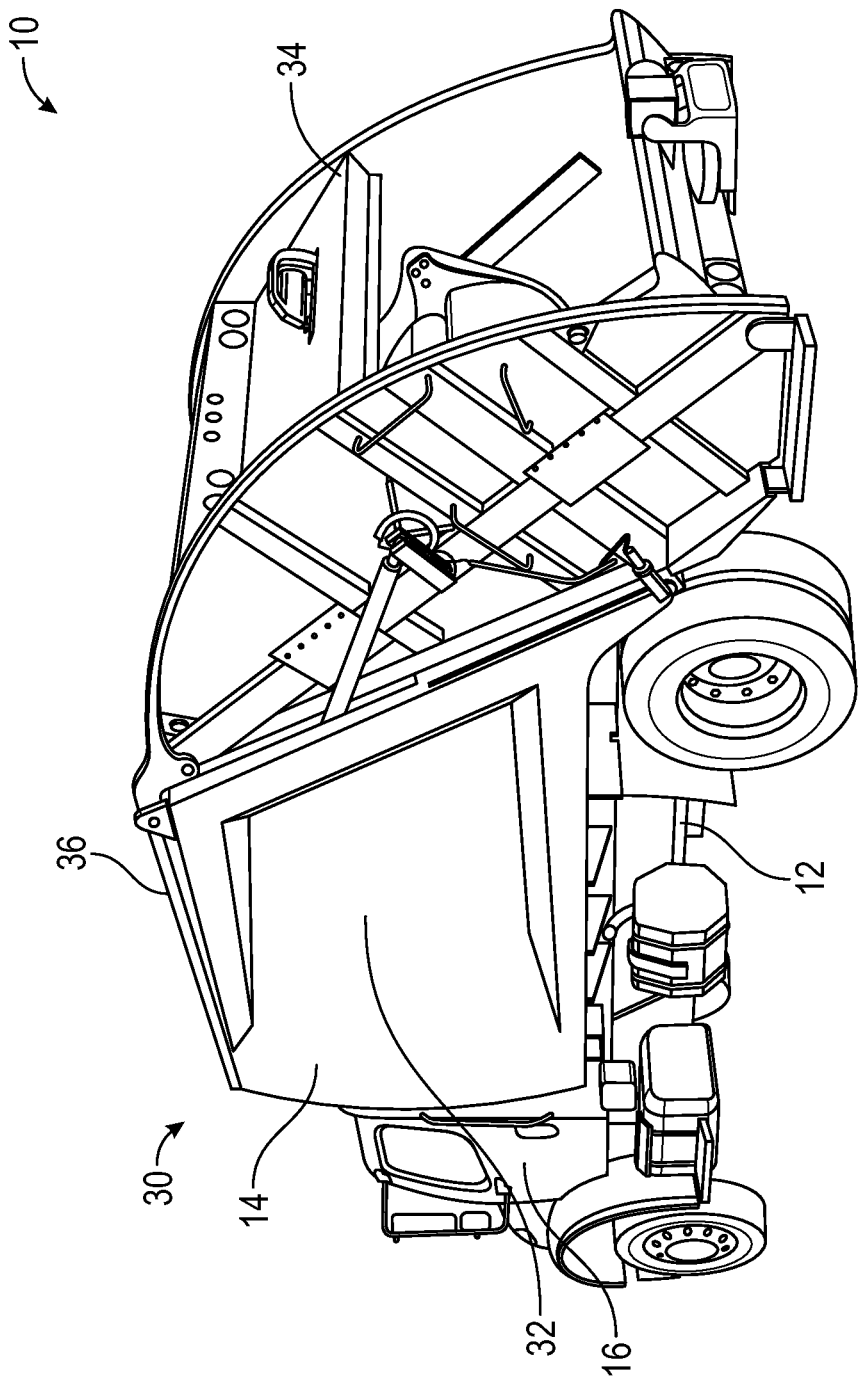

As shown in FIGS. 1A-1C, the vehicle 10 includes a chassis, shown as frame 12; a body assembly, shown as body 14, coupled to frame 12 (e.g., at a rear end thereof, etc.); and a cab, shown as cab 16, coupled to frame 12 (e.g., at a front end thereof, etc.). Cab 16 may include various components to facilitate operation of the refuse vehicle 10 by an operator (e.g., a seat, a steering wheel, actuator controls, a user interface, switches, buttons, dials, etc.). As shown in FIGS. 1A-1B the refuse vehicle 10 includes a prime mover, shown as motor 18. In some embodiments, the prime mover is or includes an internal combustion engine. According to the exemplary embodiment shown in FIG. 1, motor 18 is coupled to frame 12 at a position beneath cab 16. Motor 18 is configured to provide power to a plurality of tractive elements, shown as wheels 19 (e.g., via a drive shaft, axles, etc.) and/or to other systems of the refuse vehicle 10 (e.g., a pneumatic system, a hydraulic system, etc.). In other embodiments, motor 18 is otherwise positioned. In some embodiments, the refuse vehicle 10 includes a plurality of other motors (e.g., electric motors, etc.) to facilitate independently driving one or more of the wheels 19. In still other embodiments, motor 18 or a secondary motor is coupled to and configured to drive a hydraulic system that powers hydraulic actuators.

In one embodiment, the refuse vehicle 10 is a completely electric refuse vehicle. For example, motor 18 includes one or more electric motors coupled to frame 12 (e.g., a hybrid refuse vehicle, an electric refuse vehicle, etc.). In other embodiments, the refuse vehicle 10 includes an internal combustion generator that utilizes one or more fuels (e.g., gasoline, diesel, propane, natural gas, hydrogen, etc.) to generate electricity to power motor 18, power actuators, and/or power the other accessories (e.g., a hybrid refuse vehicle, etc.). For example, the refuse vehicle 10 may have an electric motor augmented by motor 18 (e.g., a combustion engine) to cooperatively provide power to wheels 19 and/or other systems of the refuse vehicle 10. In other embodiments, the refuse vehicle 10 may consume electrical power from an external power source (e.g., overhead power lines, etc.) and provide power to the systems of the refuse vehicle 10.

As shown in FIG. 1A, the vehicle 10, shown as the refuse vehicle 10 (e.g., a garbage truck, a waste collection truck, a sanitation truck, a recycling truck, etc.), is configured as a front-loading refuse truck. In the alternate embodiment shown in FIG. 1B, the refuse vehicle 10 is configured as a side-loading refuse truck. In the alternate embodiment shown in FIG. 1C, the refuse vehicle 10 is configured as a rear-loading refuse truck. In still other embodiments, the vehicle 10 is another type of vehicle (e.g., a skid-loader, a telehandler, a plow truck, a boom lift, a fire fighting truck, a plow truck, a military vehicle, etc.).

According to the exemplary embodiments shown in FIGS. 1A-1C, the refuse vehicle 10 is configured to transport refuse from various waste receptacles within a municipality to a storage and/or processing facility (e.g., a landfill, an incineration facility, a recycling facility, etc.). As shown in FIG. 1A, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1A, the body 14 and refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, as in front-loading or side-loading refuse vehicles). In other embodiments, the storage volume is positioned between the hopper volume and the cab 16 (e.g., a rear-loading refuse vehicle, etc.).

As shown in FIG. 1A, the refuse vehicle 10 includes a lift mechanism/system (e.g., a front-loading lift assembly, etc.), shown as front-lift assembly 40, coupled to the front end of body 14. The front-lift assembly 40 is configured to engage a container (e.g., a residential trash receptacle, a commercial trash receptacle, a container having a robotic grabber arm, etc.), shown as refuse container 60. The front-lift assembly 40 includes a pair of arms, shown as lift arms 52, coupled to the frame 12 and/or the body 14 on either side of the refuse vehicle 10 such that the lift arms 52 extend forward of the cab 16 (e.g., a front loading refuse vehicle, etc.). The lift arms 52 may be rotatably coupled to the frame 12 with a pivot (e.g., a lug, a shaft, etc.). The front-lift assembly 40 may include various types of actuators (e.g., electric actuators, hydraulic actuators, pneumatic actuators, etc.) to facilitate movement of the lift assembly. The front-lift assembly 40 includes first actuators, shown as lift arm actuators 54 (e.g., hydraulic cylinders, etc.), coupled to the frame 12 and the lift arms 52. The lift arm actuators 54 are positioned such that extension and retraction thereof rotates the lift arms 52 about an axis extending through the pivot.

As shown in FIG. 1A, front-lift assembly 40 includes second actuators, shown as articulation actuators 56 (e.g., hydraulic cylinders, etc.). In some embodiments, articulation actuators 56 are positioned to articulate attachment assembly 58. Such articulation may assist in tipping refuse out of lift container attachment 60 and/or a refuse can (e.g., coupled to the front-lift assembly 40 by a fork attachment, etc.) and into the hopper volume of refuse compartment 30 through an opening in cover 36. Lift arm actuators 54 may thereafter rotate the lift arms 52 to return empty container attachment 60 to the ground. In some embodiments, top door 38 is movably coupled along cover 36 to seal the opening thereby preventing refuse from escaping refuse compartment 30 (e.g., due to wind, bumps in the road, etc.).

The attachment assembly 58 may be coupled to the lift arms 52 of the front-lift assembly 40. The attachment assembly 58 is configured to engage with a first attachment, shown as refuse container 60, to selectively and releasably secure refuse container 60 to the front-lift assembly 40. As denoted herein, refuse container 60 may include any type of residential, commercial, or industrial refuse can. Refuse container 60 may also be a first lift container attachment 60. In some embodiments, the attachment assembly 58 is configured to engage with a second attachment, such as a fork attachment (not shown), to selectively and releasably secure second attachment to the front-lift assembly 40. In some embodiments, the attachment assembly 58 is configured to engage with another type of attachment (e.g., a street sweeper attachment, a snowplow attachment, a snow blower attachment, a towing attachment, a wood chipper attachment, a bucket attachment, a cart tipper attachment, a grabber attachment, etc.).

According to an exemplary embodiment shown in FIG. 1B, the refuse vehicle 10 includes a lift mechanism coupled to a side of body 14 (i.e., a side-loading lift assembly), shown as side-lift assembly 100. The side-lift assembly 100 includes a grabber assembly, shown as grabber assembly 42, slidably coupled to a guide, shown as track 20, and configured to move along an entire length of the track 20. The track 20 is shown to extend along substantially an entire height of the body 14 and is configured to cause the grabber assembly 42 to tilt or rotate near an upper height of the body 14. In other embodiments, the track 20 extends along substantially an entire height of the body 14 on a rear side of the body 14.

Figure 2A:
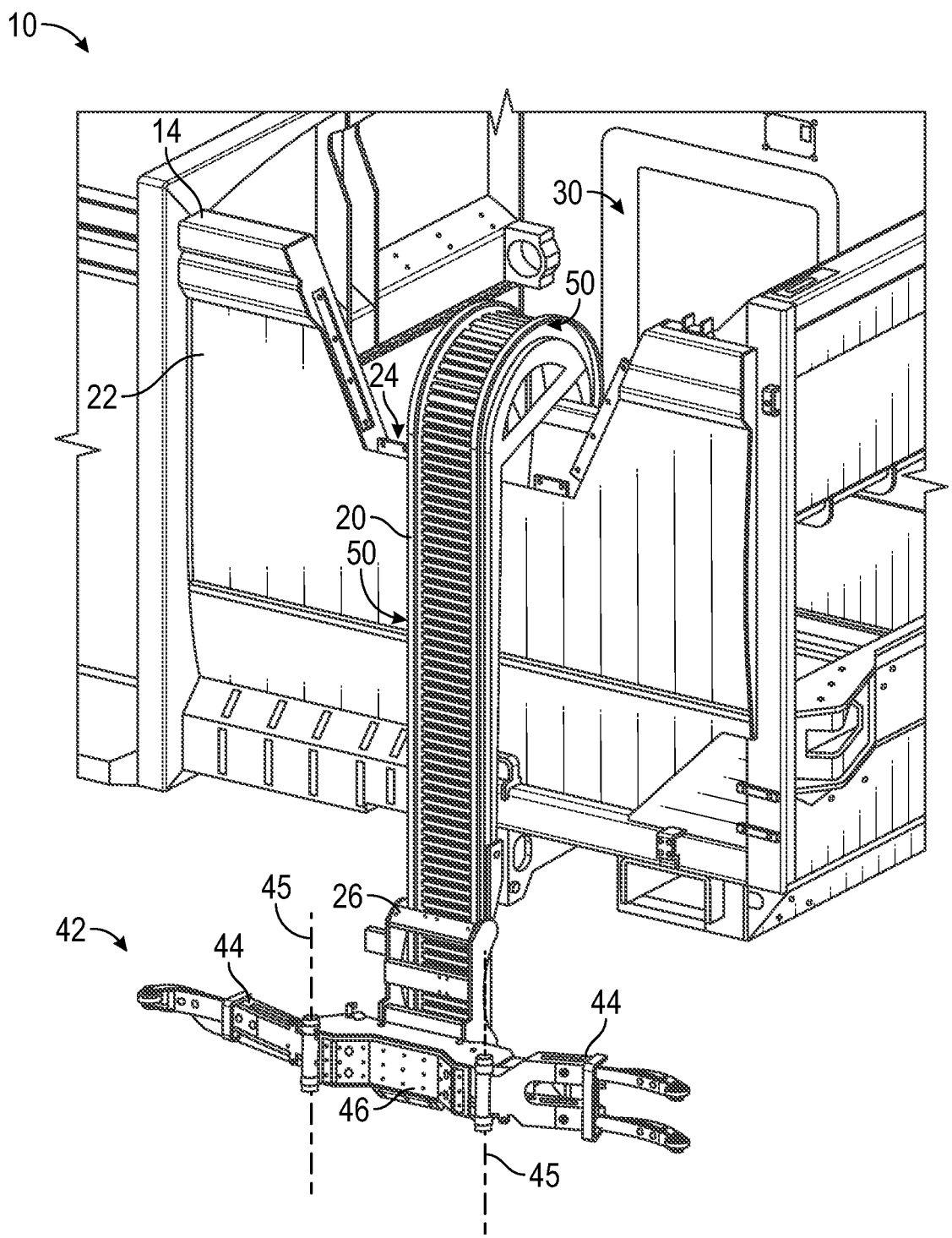
FIG. 2A is a perspective view of a first type of actuator assembly for use with the refuse vehicle of FIG. 1B, according to some embodiments.

The grabber assembly 42 is shown to include a pair of actuators, shown as actuators 44. The actuators 44 are configured to releasably secure a refuse can to the grabber assembly 42, according to an exemplary embodiment. The actuators 44 are selectively repositionable (e.g., individually, simultaneously, etc.) between an engaged position or state and a disengaged position or state. In the engaged position, the actuators 44 are rotated towards one other such that the refuse can may be grasped there between. In the disengaged position, the actuators 44 rotate outwards (e.g., as shown in FIG. 2A) such that the refuse can is not grasped by the actuators 44. By transitioning between the engaged position and the disengaged position, the actuators 44 releasably couple the refuse can to the grabber assembly 42.

In operation, the refuse vehicle 10 may pull up alongside the refuse can, such that the refuse can is positioned to be grasped by the grabber assembly 42 therein. The grabber assembly 42 may then transition into an engaged state to grasp the refuse can. After the refuse can has been securely grasped, the grabber assembly 42 may be transported along the track 20 (e.g., by an actuator) with the refuse can. When the grabber assembly 42 reaches the end of track 20, grabber assembly 42 may tilt and empty the contents of the refuse can into the refuse compartment 30. The tilting is facilitated by the path of track 20. When the contents of the refuse can have been emptied into refuse compartment 30, grabber assembly 42 may descend along track 20 and return the refuse can to the ground. Once the refuse can has been placed on the ground, the grabber assembly 42 may transition into the disengaged state, releasing the refuse can.

According to an exemplary embodiment as shown in FIG. 1C, the refuse vehicle 10 includes a rear-loading assembly coupled to a rear of the body 14 shown as rear-loading assembly 150. The rear-loading assembly 150 is configured to accept refuse and facilitate the compaction and movement of refuse from the rear-loading assembly 150 to the refuse compartment 30.

Figure 2B:
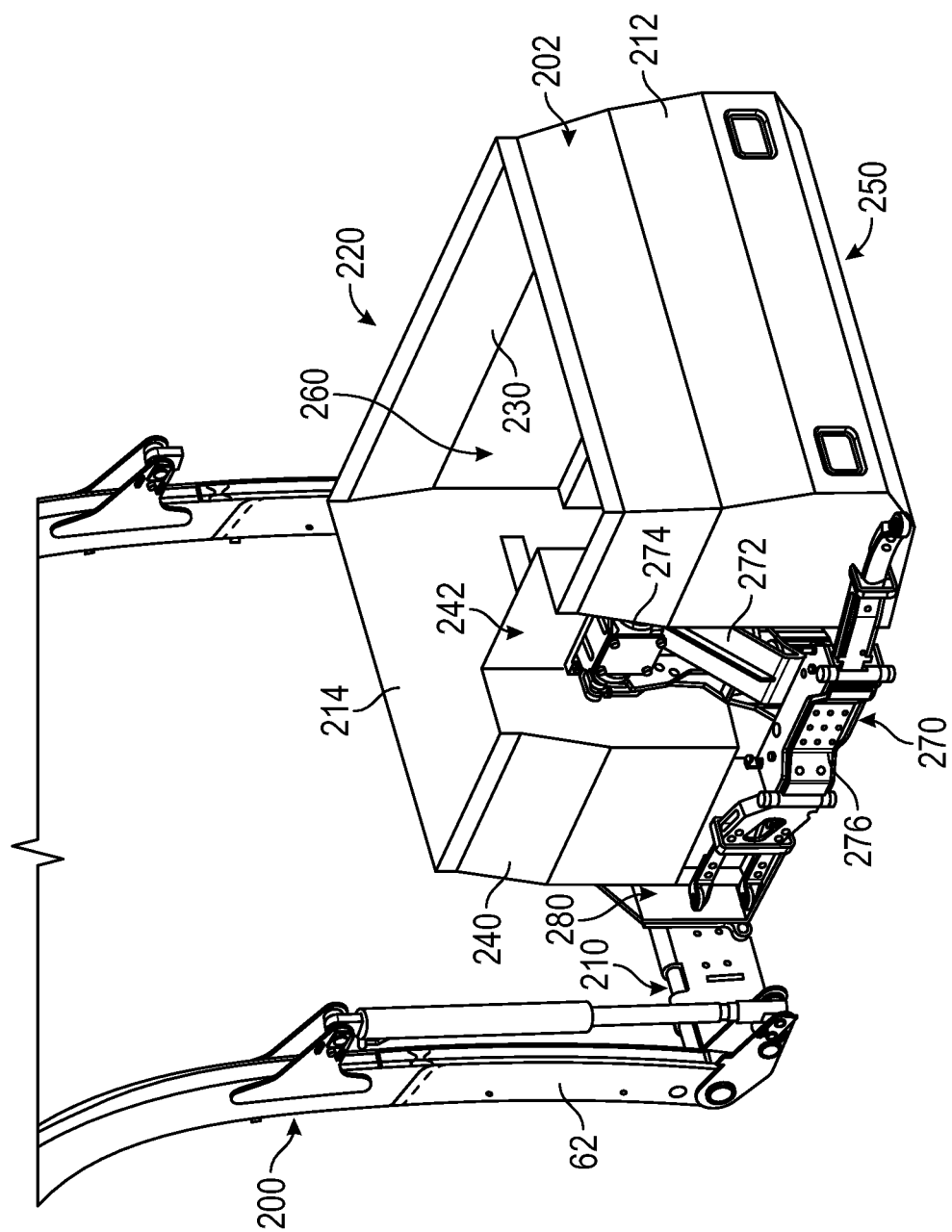
FIG. 2B is a perspective view of a second type of actuator assembly for use with the refuse vehicle of FIG. 1B, according to some embodiments.

FIGS. 2A and 2B illustrate detailed perspective views of lift assemblies for use with the refuse vehicle 10, according to some embodiments. According to an exemplary embodiment shown in FIG. 2A, the side-lift assembly 100 includes the track 20, the track assembly 50 and the grabber assembly 42, which includes a frame, chassis, or connecting member, shown as the carriage 26. The track 20 extends along substantially the entire height of the body 14, according to the exemplary embodiment shown. The body 14 includes a panel, shown as loading section 22, that defines a cutout or notch, shown as recess 24, through which the track 20 passes. The recess 24 facilitates a curved portion of the track 20 extending around the top of the loading section 22 without increasing the overall height of the vehicle 10. When the grabber assembly 42 moves along the curved portion of the track 20, the grabber assembly 42 is inverted to empty the refuse can releasably coupled to the grabber assembly 42 into the refuse compartment 30.

The carriage 26 is slidably coupled to the track 20. In operation, the carriage 26 may translate along a portion or all of the length of the track 20. The carriage 26 is removably coupled (e.g., by removable fasteners) to a body or frame of the grabber assembly 42, shown as grabber frame 46. Alternatively, the grabber frame 46 may be fixedly coupled to (e.g., welded to, integrally formed with, etc.) the carriage 26. The actuators 44 are each pivotally coupled to the grabber frame 46 such that they rotate about a pair of axes 45. The axes 45 extend substantially parallel to one another and are longitudinally offset from one another. In some embodiments, one or more actuators configured to rotate the actuators 44 between the engaged state and the disengaged state are coupled to the grabber frame 46 and/or the carriage 26.

According to an exemplary embodiment shown in FIG. 2B, the container attachment 220 includes a container, shown as refuse can 202; an articulating refuse collection arm, shown as collection arm assembly 270; and an interface, shown as attachment interface 280. The refuse can 202 has a first wall, shown as front wall 210; an opposing second wall, shown as rear wall 214 (e.g., positioned between the cab 16 and the front wall 210, etc.); a first sidewall, shown as first sidewall 230; an opposing second sidewall, shown as second sidewall 240; and a bottom surface, shown as bottom 250. The front wall 210, the rear wall 214, the first sidewall 230, the second sidewall 240, and the bottom 250 cooperatively define an internal cavity, shown as container refuse compartment 260. According to an exemplary embodiment, the container refuse compartment 260 is configured to receive refuse from a refuse can (e.g., a residential garbage can, a recycling bin, etc.).

The second sidewall 240 of the refuse can 202 defines a cavity, shown as recess 242. The collection arm assembly 270 is coupled to the refuse can 202 and may be positioned within the recess 242. In other embodiments, the collection arm assembly 270 is otherwise positioned (e.g., coupled to the rear wall 214, coupled to the first sidewall 230, coupled to the front wall 210, etc.). According to an exemplary embodiment, the collection arm assembly 270 includes an arm, shown as arm 272; a grabber assembly, shown as grabber 276, coupled to an end of the arm 272; and an actuator, shown as actuator 274. The actuator 274 may be positioned to selectively reorient the arm 272 such that the grabber 276 is extended laterally outward from and retracted laterally inward toward the refuse can 202 to engage (e.g., pick up, etc.) a refuse can (e.g., a garbage can, a reclining bin, etc.) for emptying refuse into the container refuse compartment 260.

Figure 3A:
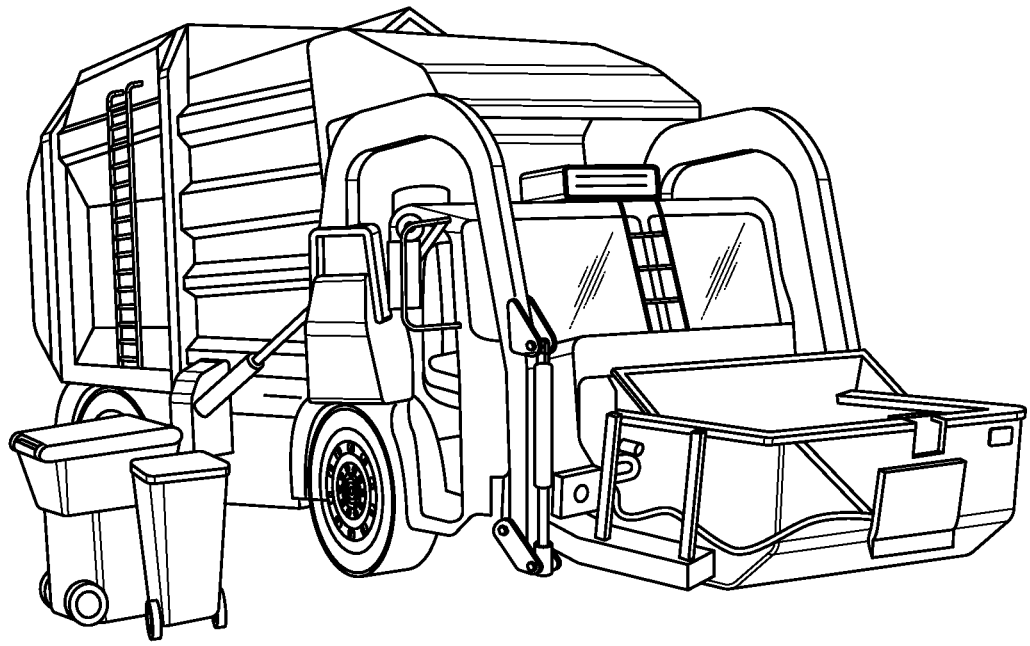
FIGS. 3A-3D are example configurations of the refuse vehicles of FIGS. 1A-1C, according to some embodiments.
Figure 3B:
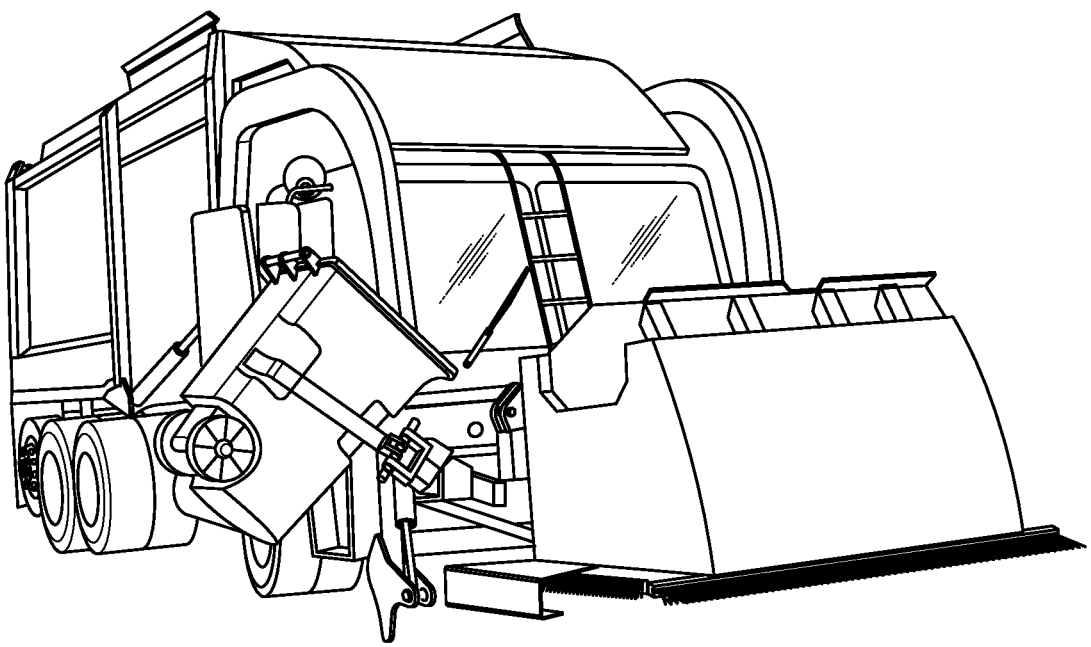
Figure 3C:
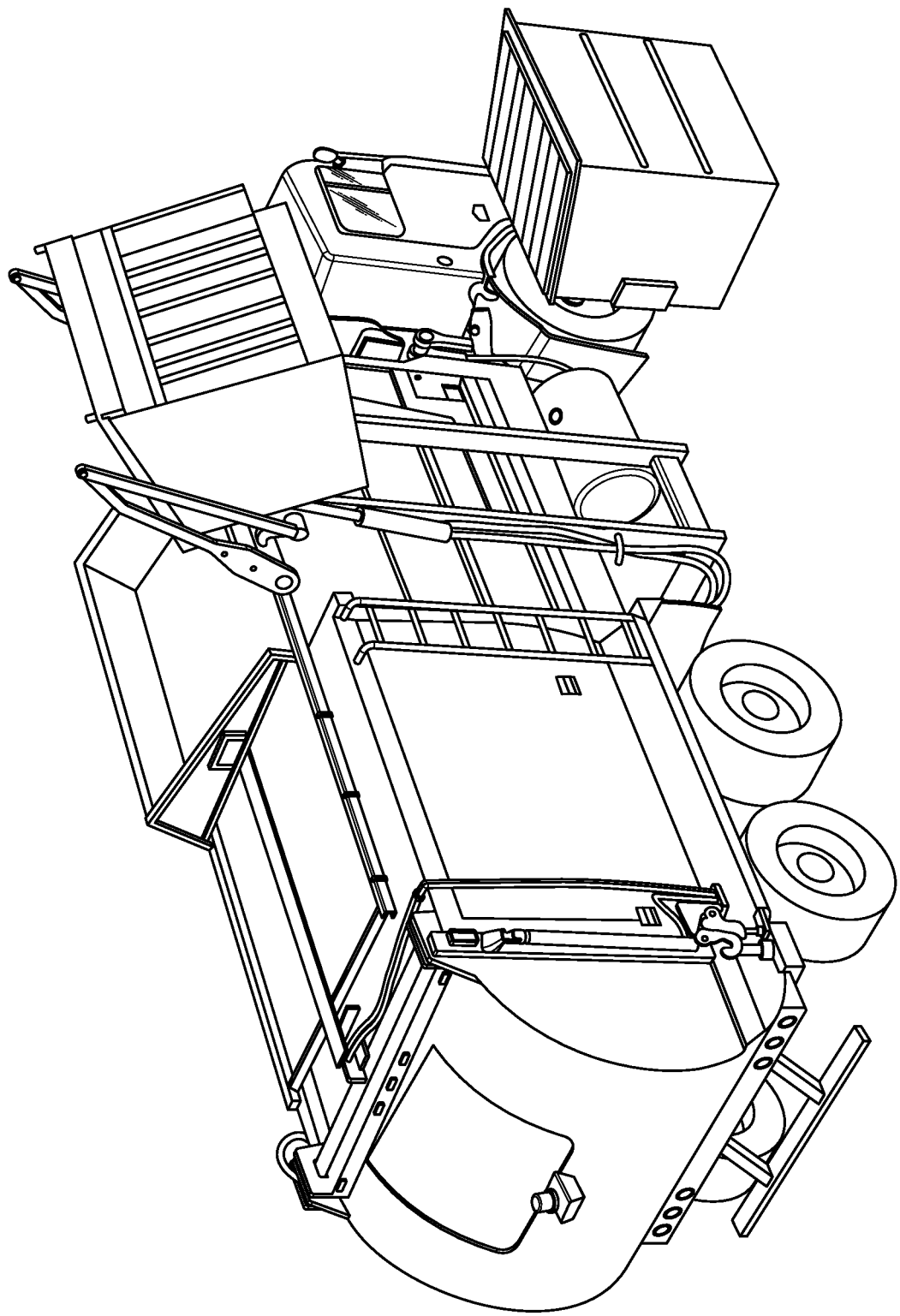
Figure 3D:
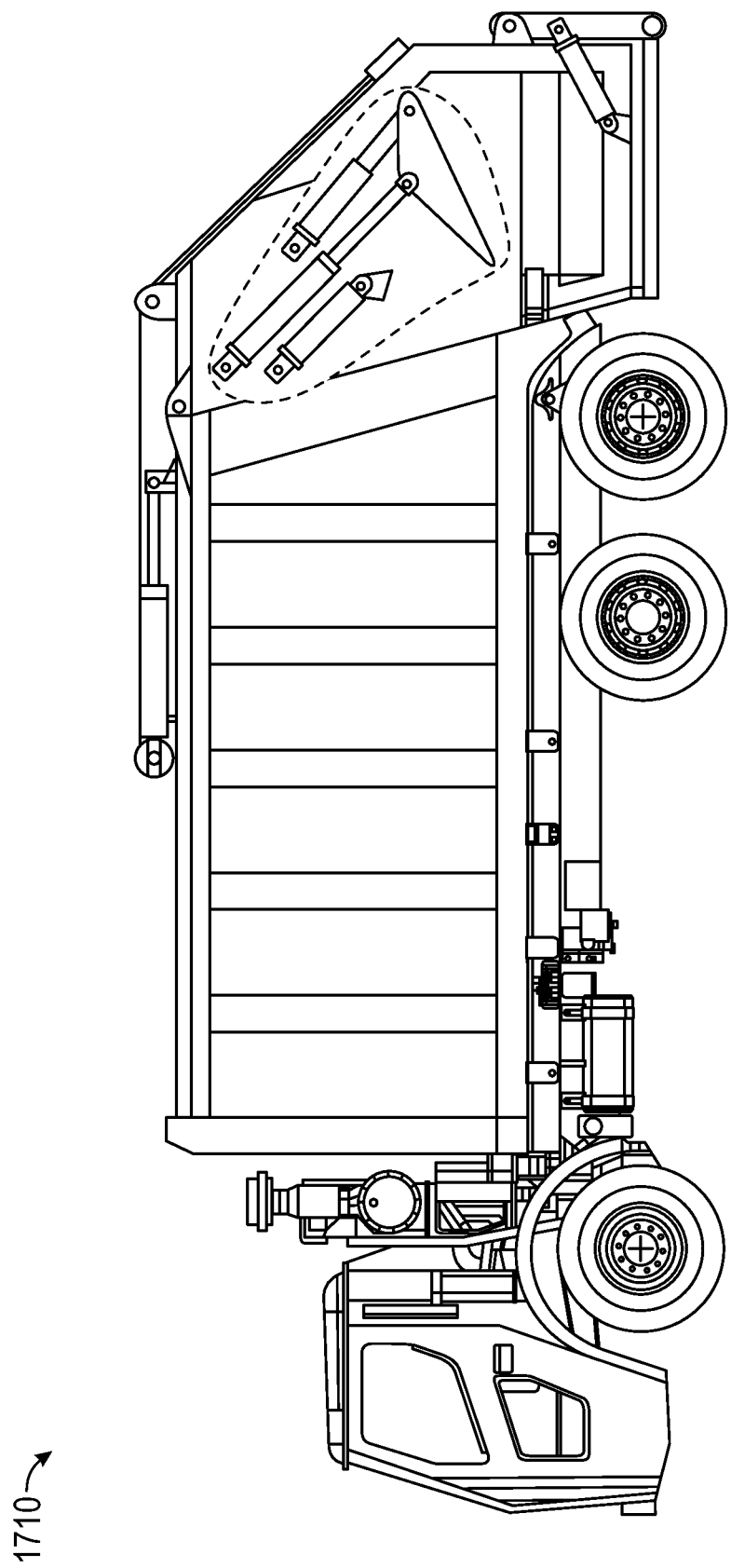

As shown in FIGS. 3A-3D, the refuse vehicle 10 is configured according to other exemplary embodiments in addition to the configurations described above with respect to FIGS. 1A-1C and 2A-2B. Specifically, FIG. 3A illustrates a front-loading configuration of the refuse vehicle 10 with an intermediate storage container. FIG. 3B illustrates another front-loading configuration of the refuse vehicle 10 with an intermediate storage container that includes an actuator assembly (e.g., similar to container attachment 220). FIG. 3C illustrates a side-loading configuration of the refuse vehicle 10 (e.g., an auto side-loader) with a grabber-tipper assembly configured to engage an industrial or commercial refuse can. FIG. 3D illustrates a rear-loading configuration of the refuse vehicle 10 with a rear-loading assembly according to another embodiment. It will be appreciated that the configurations shown in FIGS. 3A-3D illustrate example configurations of the refuse vehicle 10 and are not intended to be limiting. As described above, the refuse vehicle 10 is configured in any number of front, side, and/or rear-loading configurations, with any type of lift and/or grabber assembly for engaging a commercial or residential refuse can.

Spatial Awareness System

Figure 4:
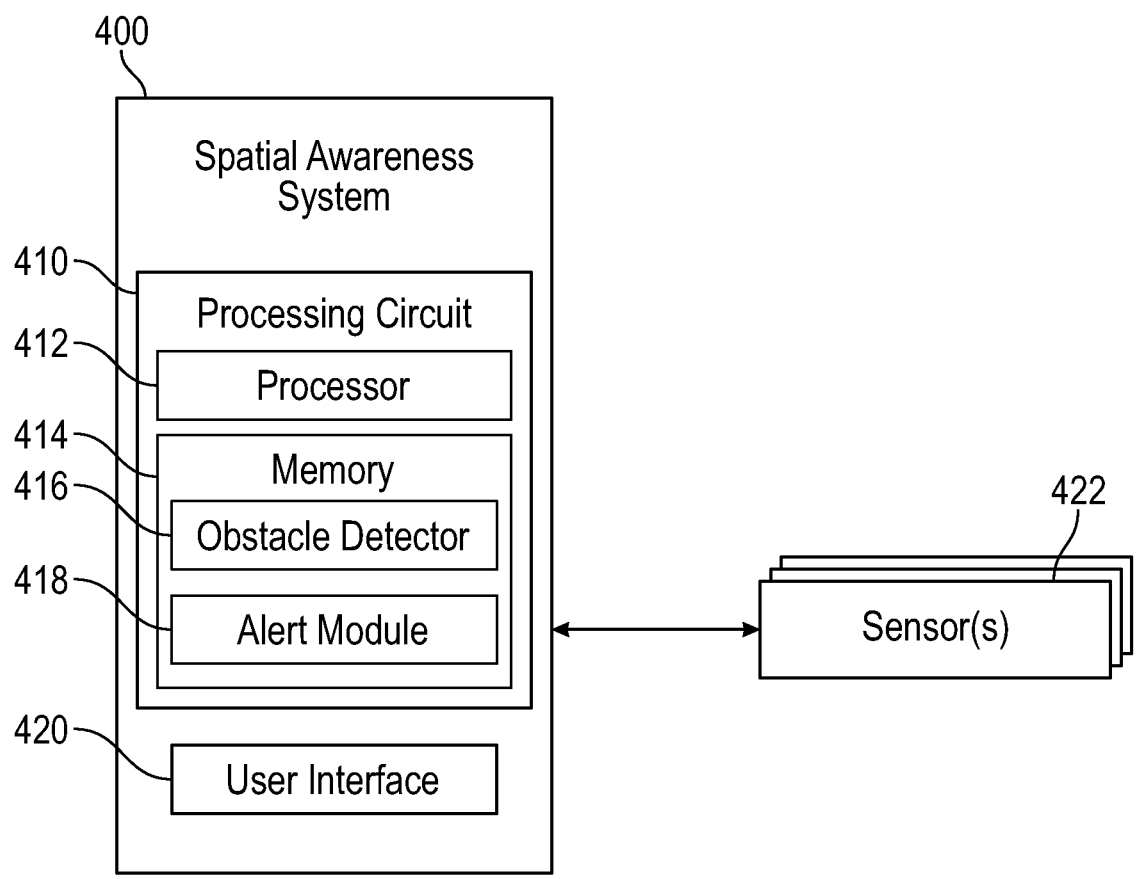
FIG. 4 is a block diagram of a controller for use with a refuse vehicle with spatial awareness, according to an exemplary embodiment.

According to an exemplary embodiment shown in FIG. 4, a controller for use with vehicle 10 with spatial awareness is shown, according to some embodiments. The controller 400 may be one of one or more controllers of the refuse vehicle 10. The controller 400 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, the controller 400 includes a processing circuit 410 having a processor 412 and a memory 414. The processing circuit 410 may include an ASIC, one or more FPGAs, a DSP, circuits containing one or more processing components, circuitry for supporting a microprocessor, a group of processing components, or other suitable electronic processing components. In some embodiments, the processing circuit 410 of the controller 400 is implemented via one or more graphics processing units (GPUs). The processor 412 can be implemented as a general-purpose processor, an application specific integrated circuit (ASIC), one or more field programmable gate arrays (FPGAs), a group of processing components, or other suitable electronic processing components. In some embodiments, the processor 412 is implemented as one or more graphics processing units (GPUs). The processor 412 may be coupled to memory 414. The processor 412 is configured to execute computer code or instructions stored in memory 414 or received from other computer readable media (e.g., CDROM, network storage, a remote server, etc.) to facilitate the activities described herein. In The memory 414 According to an exemplary embodiment, the memory 414 includes computer code modules (e.g., executable code, object code, source code, script code, machine code, etc.) configured for execution by the processor 412.

The memory 414 may be any volatile or non-volatile computer-readable storage medium capable of storing data or computer code relating to the activities described herein. The memory 414 may include one or more devices (e.g., memory units, memory devices, storage devices, etc.) for storing data and/or computer code for completing and/or facilitating the various processes described in the present disclosure. Memory 414 may include random access memory (RAM), read-only memory (ROM), hard drive storage, temporary storage, non-volatile memory, flash memory, optical memory, or any other suitable memory for storing software objects and/or computer instructions. Memory 414 may include computer code modules (e.g., executable code, object code, source code, script code, machine code, etc.) configured for supporting the various activities and information structures described herein. The memory 414 may be communicably connected to processor 412 via processing circuit 410 and may include computer code for executing (e.g., by processor 412) one or more of the processes described herein.

According to the exemplary embodiment shown in FIG. 4, the controller 400 receives and processes data from one or more image and/or object sensor(s) 422. The sensor(s) 422 may be disposed at various locations of the refuse vehicle 10 to identify obstacles such as persons in a blind spot of the refuse vehicle 10. The sensor(s) 422 may include any type of device that is configured to capture data associated with the detection of objects such as refuse containers and/or pedestrians. The sensor(s) 422 includes any one and/or a combination of proximity sensors, infrared sensors, electromagnetic sensors, capacitive sensors, photoelectric sensors, inductive sensors, radar, ultrasonic sensors, Hall Effect sensors, fiber optic sensors, Doppler Effect sensors, magnetic sensors, laser sensors (e.g., LIDAR sensors), sonar, and/or the like. In some embodiments, the sensor(s) 422 include an image capture device such as visible light cameras, full-spectrum cameras, image sensors (e.g., charged-coupled device (CCD), complementary metal oxide semiconductor (CMOS) sensors, etc.), or any other type of suitable object sensor or imaging device. Data captured by the sensor(s) 422 may include, for example, raw image data from one or more cameras (e.g., visible light cameras) and/or data from one or more sensors (e.g., LIDAR, radar, etc.) that may be used to detect objects. For example, the sensor(s) 422 may include a camera and/or software component configured to determine a distance to obstacles identified in images from the camera. In some embodiments, the sensor(s) 422 are active during operation of the refuse vehicle 10. Additionally or alternatively, the sensor(s) 422 may become active in response to a condition of the refuse vehicle 10. For example, the sensor(s) 422 may active in response to the refuse vehicle 10 being put into a reverse gear.

The sensor(s) 422 may be disposed at any number of locations throughout and/or around the refuse vehicle 10 for capturing image and/or object data from any direction with respect to the refuse vehicle 10. For example, sensor(s) 422 may include a plurality of visible light cameras, radar sensors, and LIDAR cameras/sensors mounted on the forward and lateral sides of the refuse vehicle 10 for capturing data as the refuse vehicle 10 moves down a path (e.g., a roadway). In some embodiments, one or more of sensor(s) 422 may be located on an attachment utilized by the refuse vehicle 10, such as container attachment 60 described above. It should be understood that sensor(s) 422 may be positioned anywhere on the refuse vehicle 10.

According to the exemplary embodiment shown in FIG. 4, the memory 414 is shown to include an obstacle detector module, shown as obstacle detector 416. The obstacle detector 416 is configured to receive data from the sensor(s) 422 and determine from the data if an obstacle is present. It will be appreciated that, as denoted herein, the data received and processed by the obstacle detector 416 may include any type of data with respect to the sensor(s) 422. Data captured by the sensor(s) 422 may include, for example, raw image data from one or more cameras (e.g., visible light cameras) and/or data from one or more sensors (e.g., LIDAR, radar, etc.) that may be used to detect objects. For example, the obstacle detector 416 may receive proximity data from the sensor(s) 422 and analyze the proximity data to determine the presence of a nearby obstacle. In some embodiments, the obstacle detector 416 is configured to detect the presence of an obstacle and determine the obstacle's location or position. In some embodiments, the obstacle detector 416 is configured to determine the speed and direction of travel of an obstacle based on data provided by the sensor(s) 422. In some embodiments, the obstacle detector 416 performs object recognition. For example, the obstacle detector 416 may receive image data from the sensor(s) 422 and detect one or more target obstacles and recognize them as humans.

In some embodiments, the obstacle detector 416 classifies detected obstacles based at least in part on the data received from the sensor(s) 422. For example, obstacle detector 416 may classify obstacles as static obstacles or dynamic obstacles depending on their motion. For example, the obstacle detector 416 may classify a moving vehicle as a dynamic obstacle and a parked vehicle as a static obstacle. In some embodiments, the obstacle detector 416 determines a subclass of an obstacle. For example, the obstacle detector 416 may determine that a dynamic obstacle is a person, and that a static obstacle is a refuse container. In some embodiments, the obstacle detector 416 determines a risk associated with the obstacle. For example, the obstacle detector 416 may classify a high-speed obstacle as high risk and a low-speed obstacle as low risk.

In some embodiments, the obstacle detector 416 is configured to generate a safety zone around a refuse vehicle. For example, the obstacle detector 416 may establish a safety zone of two feet around the perimeter of the refuse vehicle 10. In some embodiments, the safety zone may extend to the outer range limit of the sensor(s) 422. In some other embodiments, the safety zone may only include the refuse vehicle 10 and its immediate area. In some embodiments, the safety zone may be set by an operator of the refuse vehicle 10. In some embodiments, the safety zone may extend only partially around the refuse vehicle 10. For example, referring now to FIG. 1A, the safety zone may encompass only the lifting assembly 40 and its range of motion.

In some embodiments, the safety zone dynamically changes based on aspects of the refuse vehicle 10 and/or its surroundings. For example, the safety zone may extend 60 ft. in front of the refuse vehicle 10 when it is traveling at highway speeds, and adjust to just 20 feet in front of the refuse vehicle 10 when traveling at low speeds. In some embodiments, the obstacle detector 416 is configured to only detect obstacles within the safety zone. In some embodiments, the obstacle detector 416 detects obstacles both within and without of the safety zone.

In some embodiments, the safety zone changes based on detected obstacles. For example, the safety zone may extend to cover a refuse container when a refuse container is detected by the obstacle detector 416. In some embodiments, the safety zone may change based on inputs from an operator of the refuse vehicle 10. For example, referring now to FIG. 1B, the safety zone may shift to encompass the path of side-lift assembly 100. It should be noted that the size and shape of the safety zone may differ according to other exemplary embodiments, and that such variations are intended to be encompassed by the present disclosure.

In some embodiments, the obstacle detector 416 is configured to generator a trajectory for the refuse vehicle 10 or its systems. For example, the obstacle detector 416 may determine the path of the front-lift assembly 40 and use the sensor(s) 422 to detect obstacles within said path. The obstacle detector 417 may generate the trajectory based on preinstalled information regarding the refuse vehicle 10 and its systems. In some embodiments, obstacle detector 416 generates the trajectory based on data collected by the sensor(s) 422. In some embodiments, the trajectory falls within the safety zone. In some embodiments, the trajectory covers only the safety zone. In some embodiments, the safety zone and trajectory both comprise the path of refuse container 60 and front-lift assembly 40. For example, the obstacle detector 416 may detect obstacles within the trajectory and/or safety zone and provide an indication of the presence of the obstacle.

Figure 15A:
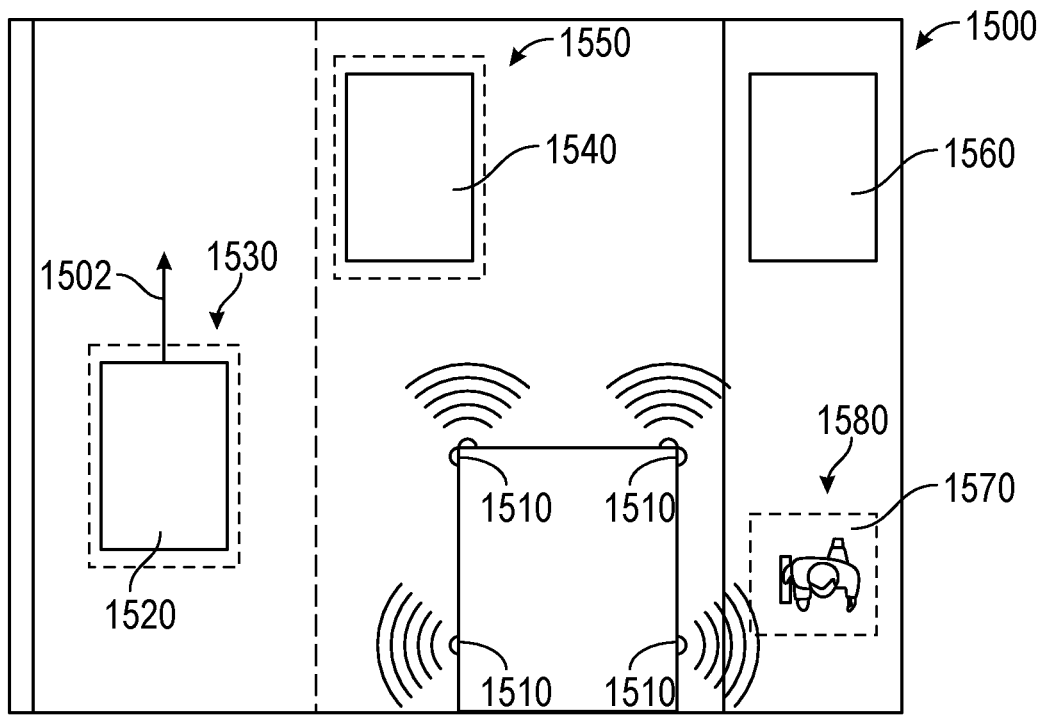
FIGS. 15A and 15B are example user interfaces illustrating a path determined by the refuse vehicle of FIGS. 1A-1C with spatial awareness, according to some embodiments.
Figure 15B:
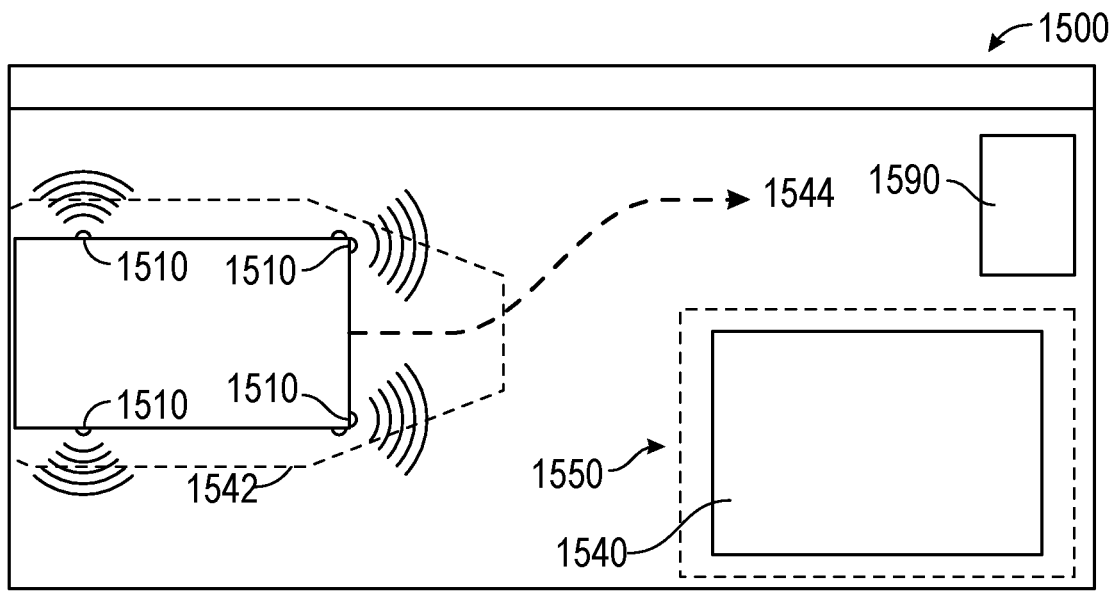
Figure 16:
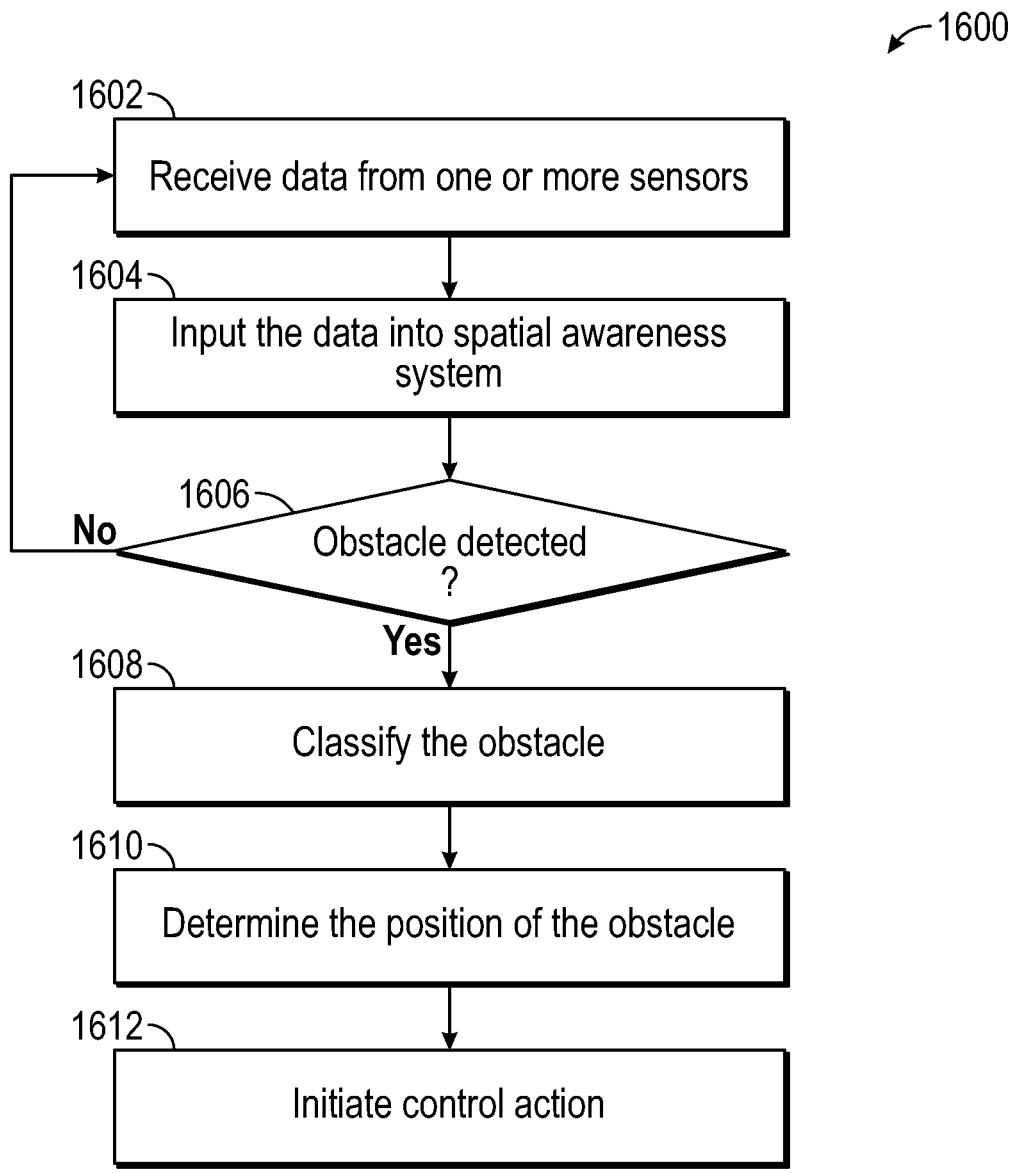
FIG. 16 is a process for detecting obstacles, according to some embodiments.

According to the exemplary embodiment shown in FIG. 4, the memory 414 includes the alert module 418. The alert module 418 receives an indication of an obstacle from obstacle detector 416 and initiates a control action based on the obstacle. For example, the control action may include controlling the movement of the refuse vehicle 10 or movement of an attached lift assembly when an obstacle is detected, or both. In some embodiments, the control action consists of additionally and/or alternatively an alert to an operator of the refuse vehicle 10. In some embodiments, the alert module 418 generates a visual alert (e.g., a graphical user interface, etc.). The alert may display a graphic on the user interface 420 to notify an operator of the refuse vehicle 10 of an approaching obstacle and its associated risk. For example, the alert module 418 may highlight a medium risk obstacle in a yellow box on a user display and highlight a high risk obstacle in a red box on the user display in the refuse vehicle 10 (e.g., a bounding box for the detected object, as shown in FIGS. 15A and 15B). In some embodiments, the alert module 418 generates an audio alert (e.g., a beep, etc.). In some embodiments, the alert module 418 generates the alert based on a classification of an obstacle. For example, the alert module 418 may generate a low volume audio alert for an obstacle labeled as low risk and may generate a high volume audio alert for an obstacle labeled as high risk. It should be understood by those of skill in the art who review this disclosure that aspects of the alerts such as the color, shape, tone, pitch, duration, and/or volume etc., may differ according to other exemplary embodiments, and that such variations are intended to be encompassed by the present disclosure.

In some embodiments, the alert module 418 alerts the obstacle of the refuse vehicle 10. For example, the alert module 418 may generate an audio warning for an obstacle determined to be a pedestrian detected in a blind spot of the refuse vehicle 10. For further example, in addition and/or alternatively to the audio warning the alert module 418 may generate a visual warning (e.g., flashing lights) to alert a pedestrian of the refuse vehicle 10. In some embodiments, the alert module 418 generates an alert for an operator of the refuse vehicle 10 that is outside of cab 16. For example, the alert module 418 may generate an audio alert for an approaching high-risk obstacle to warn an operator of its approach.

In some embodiments, the alert module 418 initiates, additionally or alternatively to generating an alert, a control action which controls the movement of the refuse vehicle 10 and its various systems in order to avoid the obstacle. For example, referring now to FIG. 1A, the alert module 418 may stop the movement of lift assembly 40 when an obstacle is detected that may be in its path. In some embodiments, the control action controls the movement of the refuse vehicle 10. For example, upon receipt of an indication of an obstacle such as a pedestrian, the alert module 418 may stop the movement of the refuse vehicle 10 until the pedestrian is on longer detected. In some embodiments, the control action persists until an operator of the refuse vehicle 10 overrides it. For example, the control action may comprise a graphical alert through a user interface to an operator and an automatic suspension of the refuse vehicle 10's travel until the operator address the alert through a user interface. In some embodiments, the control action persists until the obstacle is no longer detected. For example, the alert module 418 may alert an operator of the refuse vehicle 10 of a pedestrian with an auditory alert. The alert may cease automatically once the pedestrian is no longer detected. In some embodiments, the control action persists until the classification of an obstacle has changed. For example, the alert module 418 may initiate a control action including an auditory alert when a dynamic obstacle such as a moving pedestrian is detected. The alert module 418 may cease the audio alert when the pedestrian stops walking and the obstacle detector 416 reclassifies the pedestrian as a static obstacle.

According to the exemplary embodiment shown in FIG. 4, controller 400 is shown to user interface 420. The user interface 420 is configured to present information to and receive information from a user. Examples of user interfaces or devices include, but are not limited to, mobile phones, electronic tablets, laptops, desktop computers, workstations, and other types of electronic devices. In some embodiments, user interface 420 is a control system (i.e., a control panel) configured to display information to an operator of the refuse vehicle 10 and/or receive user inputs. In some embodiments, user interface 420 includes a display device (e.g., a monitor, a touchscreen, etc.). In some embodiments, user interface 420 includes an audio device (e.g., a microphone, a speaker, etc.). In some embodiments, user interface 420 receives alerts from the alert module 418 and presents the alerts to an operator of the refuse vehicle 10. For example, user interface 420 may receive a visual alert from the alert module 418 and display a graphic on a display device to alert an operator of the refuse vehicle 10 of a pedestrian in a blind spot of the refuse vehicle 10. In some embodiments of controller 400 installed in refuse vehicle 10, the user interface 420 includes a touchscreen display panel located in the cab 16 of the refuse vehicle 10 and configured to present an operator with a variety of information regarding the operations of the refuse vehicle 10. User interface 420 may further include a user input device, such as a keyboard, a joystick, buttons, etc.

Figure 5:
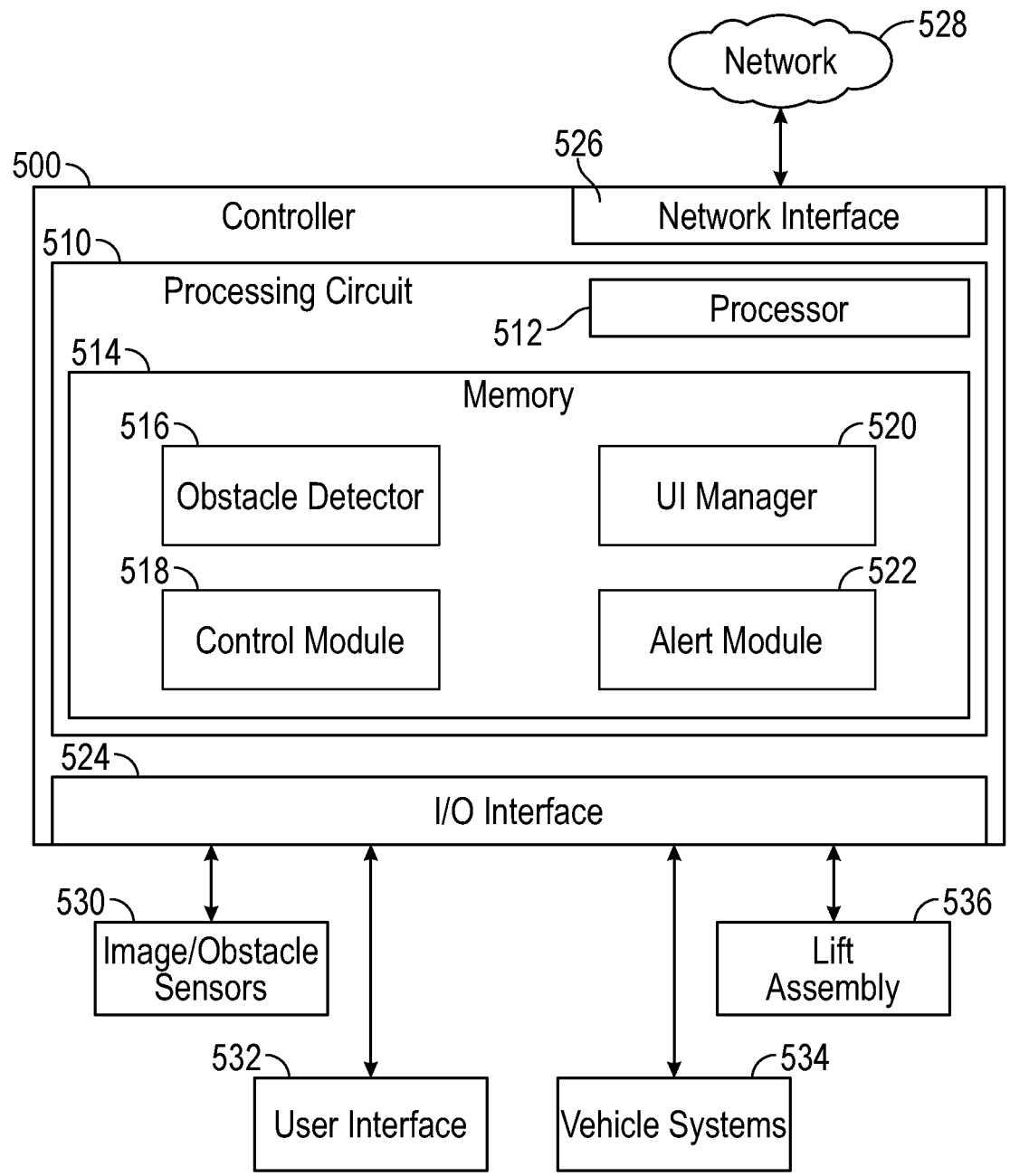
FIG. 5 is a block diagram of a controller for use with a refuse vehicle with spatial awareness, according to another exemplary embodiment.

According to the exemplary embodiment shown in FIG. 5, an alternative embodiment of a controller for a refuse vehicle 10 with spatial awareness is shown. The controller, shown as controller 500, includes a processing circuit 510, processor 512, and memory 514. The memory 514 includes control module 518 and UI manager 520, in addition to an obstacle detector 516 and an alert module 522. The controller 500 is shown to communicate through a I/O Interface 524 with sensor(s) shown as image/obstacle sensor(s) 530, a user interface 532, a vehicle systems 534, and lift assembly 536.

The processing circuit 510 can be communicably connected to a network interface 526 and an input/output (I/O) interface 524, such that the processing circuit 510 and the various components thereof can send and receive data via the interfaces 524 and 526. In some embodiments, the controller 500 is communicably coupled with a network 528 via the network interface 526, for transmitting and/or receiving data from/to network-connected devices. The network 528 may be any type of network (e.g., intranet, Internet, VPN, a cellular network, a satellite network, etc.) that allows the controller 500 to communicate with other remote systems. For example, the controller 500 may communicate with a server (i.e., a computer, a cloud server, etc.) to send and receive information regarding operations of controller 500 and/or the refuse vehicle 10.

The network interface 526 may include any type of wireless interface (e.g., antennas, transmitters, transceivers, etc.) for conducting data communications with the network 528. In some embodiments, the network interface 526 includes a cellular device configured to provide the controller 500 with Internet access by connecting the controller 500 to a cellular tower via a 2G network, a 3G network, an LTE network, a 5G network, etc. In some embodiments, the network interface 526 includes other types of wireless interfaces such as Bluetooth, Wi Fi, ZigBee, etc.

In some embodiments, the controller 500 receives over-the-air (OTA) updates or other data from a remote system (e.g., a server, a computer, etc.) via the network 528. The OTA updates may include software and firmware updates for the controller 500 for example. Such OTA updates may improve the robustness and performance on the controller 500. In some embodiments, the OTA updates may be receive periodically to keep the controller 500 up-to-date.

In some embodiments, the controller 500 is communicably coupled to any number of subsystems and devices of the refuse vehicle 10 via I/O interface 524. The I/O interface 524 may include wired or wireless interfaces (e.g., antennas, transmitters, transceivers, wire terminals, etc.) for conducting data communications with subsystems and/or devices of the refuse vehicle 10. In some embodiments, the I/O interface 524 includes a Controller Area Network (CAN) bus, a Local Interconnect Network (LIN) bus, a Media Oriented Systems Transport (MOST) bus, an SAE J1850 bus, an Inter-Integrated Circuit (I2C) bus, etc., or any other bus commonly used in the automotive industry. As shown in FIG. 5, the I/O interface 524 transmits and/or receive data from a plurality of vehicle subsystems and devices including the image/obstacle sensor(s) 530, the user interface 532, vehicle systems 534, and/or the lift assembly 536. Image/obstacles 530 may be similar and/or identical to sensor(s) 422 shown in FIG. 4.

The vehicle systems 534 shown in FIG. 5 may include any subsystem or device associated with the refuse vehicle 10. In some embodiments, the vehicle systems 534 includes, for example, powertrain components (e.g., motor 18), steering components, a grabber arm, lift assemblies, etc. The vehicle systems 534 may also include electronic control modules, control units, and/or sensors associated with any systems, subsystems, and/or devices of the refuse vehicle 10. For example, the vehicle systems 534 may include an engine control unit (ECU), a transmission control unit (TCU), a Powertrain Control Module (PCM), a Brake Control Module (BCM), a Central Control Module (CCM), a Central Timing Module (CTM), a General Electronic Module (GEM), a Body Control Module (BCM), an actuator or grabber assembly control module, etc. In this manner, any number of vehicle systems and devices may communicate with the controller 500 via the I/O interface 524.

The lift assembly 536 show in FIG. 5 may include at least the components of a lift assembly as described above for engaging, lifting, and emptying a refuse can. In some embodiments, the lift assembly 536 includes for example, any of the components of the lift assembly 40, the lift assembly 100, or the rear-loading assembly 150 described above with respect to FIGS. 1A-1C. For example, the lift assembly 536 may include the lift assembly 40, where a fork attachment is coupled to the lift assembly 40 for engaging and lifting front loading the refuse containers 60 (e.g., industrial or commercial refuse cans, as shown in FIG. 1A). In some embodiments, the lift assembly 536 includes a plurality of actuators (e.g., linear actuators, lift actuators, horizontal actuators, etc.) for moving to engage the refuse can. As an example, the lift assembly 536 is configured to move horizontally, vertically, orthogonally, etc., to the refuse vehicle 10 in order to engage a refuse can. In some embodiments, lift assembly 536 further includes an actuator assembly control module, configured to receive data and/or signals from the controller 500 to initiate control actions for a grabber arm or actuator. For example, referring back to FIG. 1A, the controller 500 is configured to limit movement of the front-lift assembly 40 represented in FIG. 5 as the lift assembly 536 when an obstacle is detected. The controller 500 may prevent movement of any component and/or all components of lift assembly 536. In some embodiments, the controller 500 is configured to store past commands to the lift assembly 536, and when an obstacle is detected, reverse the operation of the lift assembly 536 according to the order of the stored commands. It should be appreciated that the controller 400 and the controller 500 are similar and in some embodiments is configured to perform similarly and/or identically.

Figures 6A, 6B, 6C:
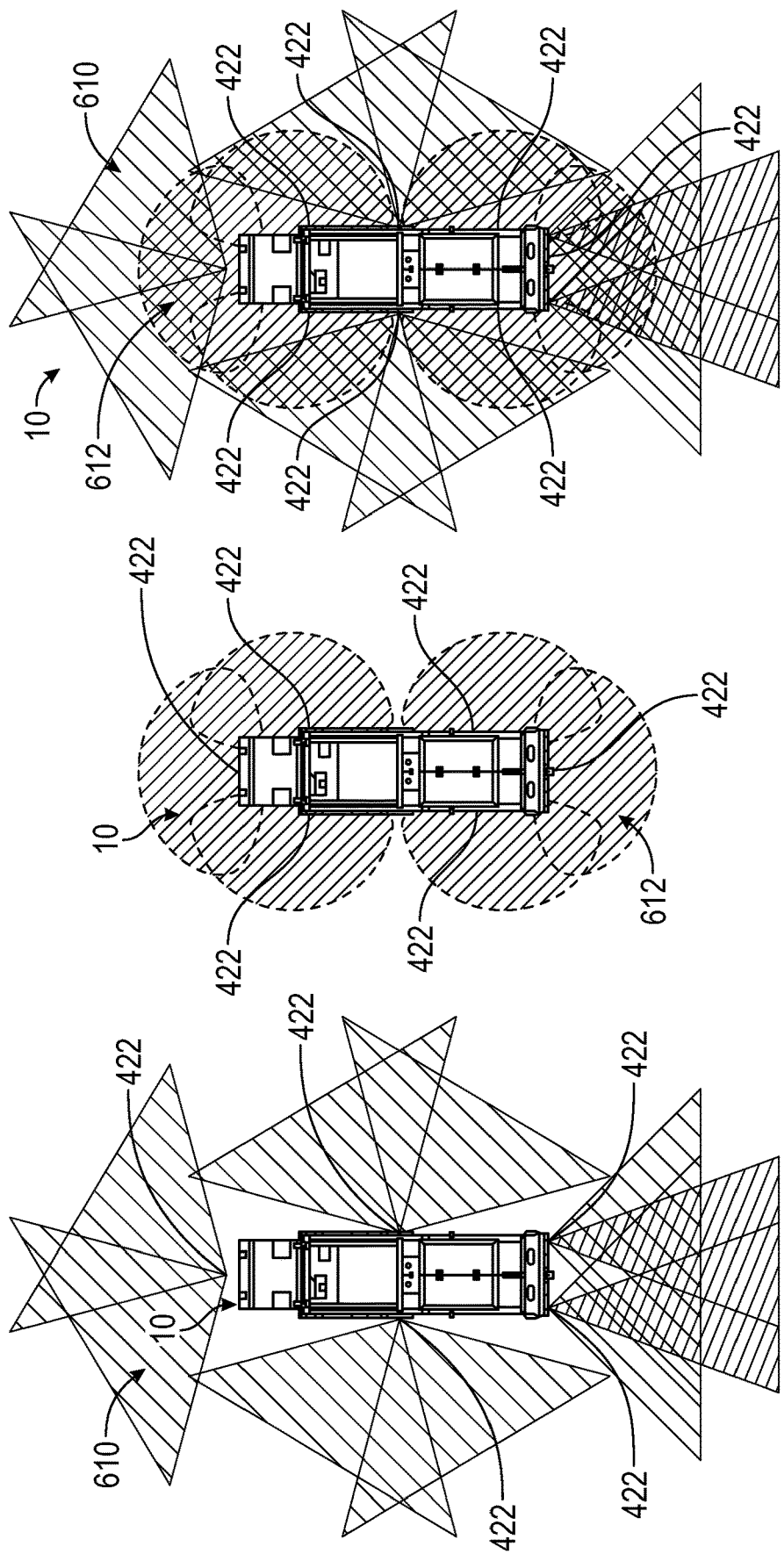
FIGS. 6A-6C are top views of the refuse vehicle of FIG. 1A with spatial awareness, illustrating the coverage zones of the sensors and cameras, according to an exemplary embodiment.

According to the exemplary embodiments shown in FIGS. 6A-6C, various configurations of sensors, shown as sensor(s) 602, disposed on a refuse vehicle 10 with spatial awareness are shown, according to some embodiments. As shown in FIG. 6A, the refuse vehicle 10 is configured as a front-loading refuse vehicle with sensors, shown as radar sensor(s) 602, and sensing arcs 610 positioned on it. In some embodiments, sensing arcs 610 of sensor(s) 602 overlap to generate a 360-degree sensing area. In some embodiments, the sensor(s) 602 are a combination of long and short-range sensors. For example, the rear of the refuse vehicle 10 may include two short-range sensor(s) 602 and two long-range sensor(s) 602. In some embodiments, the sensor(s) 602 are placed on the sides and on top of the refuse vehicle 10 to generate an all-encompassing sensed field (not shown). It should be understood that while sensor(s) 602 are shown as radar sensors 602 various other sensors as described above could also be used.

According to the exemplary embodiment shown in FIG. 6B, a refuse vehicle 10 with spatial awareness includes another set of sensor(s), shown as camera sensors 602 and sensing arcs, shown as sensing arcs 612, is shown. In some embodiments, the sensor(s) 602 are camera sensors. In some embodiments, sensor(s) 602 are placed around the entire perimeter of the refuse vehicle 10. In some embodiments, sensor(s) 602 are only placed in desired sections. For example, sensor(s) 602 may be concentrated on the side of the refuse vehicle 10. As shown in FIGS. 6A-6C sensor(s) 602 and sensing arcs 612 may leave gaps around the refuse vehicle 10. In some embodiments, additional and/or wide-angle sensors are used to fill such gaps. In some embodiments, sensor(s) 602 and sensing arcs 612 surround the refuse vehicle 10 with a substantially all-encompassing field.

According to the exemplary embodiment shown in FIG. 6C, a refuse vehicle 10 with spatial awareness includes a combination of sensors 602 and sensing arcs 612 is shown, according to some embodiments. The sensors 622 may be a combination of radar and camera sensors. The overlapping sensing arcs 610 and 612 provide 360 or near-360 degree coverage of the perimeter of the refuse vehicle 10. In some embodiments (not shown), the sensor(s) 602 are placed on top of the refuse vehicle 10 in addition to on the sides. For example, the sensor(s) 602 may be placed on the refuse vehicle 10 so as to generate a 360 degree sensing arc both horizontally and vertically, thereby allowing the sensing arcs 610 of the sensor(s) 602 to cover the entire refuse vehicle in three-dimensional space (see FIG. 13 below for further illustration). In some embodiments, the sensor(s) 602 are placed only in desired locations. For example, the sensor(s) 602 may be placed near the rear of the refuse vehicle 10 to detect obstacles in the path of the refuse vehicle 10 and near the front, side, or rear lift assembly attached to the refuse vehicle 10 to detect objects that may interfere with the operation of said lift assembly. In some embodiments, the sensor(s) 602 are located so that sensing arcs 610 and 612 are able to sense objects in three-dimensional space around the refuse vehicle 10. For example, the sensor(s) 602 may be placed on top of the refuse vehicle 10 to detect obstacles and/or barriers that may be too low for the refuse vehicle 10 to pass under. It should be noted that the position of the sensor(s) 602 in FIGS. 6A-6C may differ according to other exemplary embodiments, and that such variations are intended to be encompassed by the present disclosure.

Figure 7C:
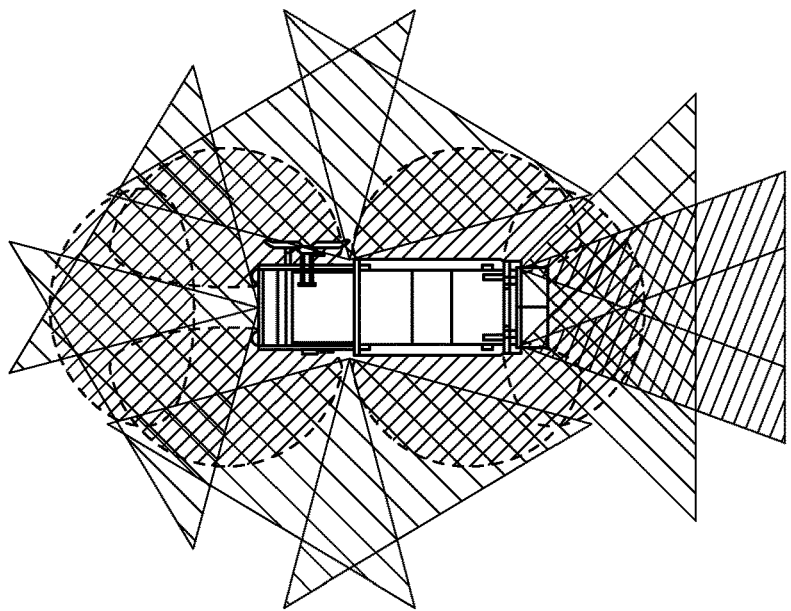
FIGS. 7A-7C are top views of the refuse vehicle of FIG. 1B with spatial awareness, illustrating the coverage zones of the sensors and cameras, according to an exemplary embodiment.
Figure 7B:
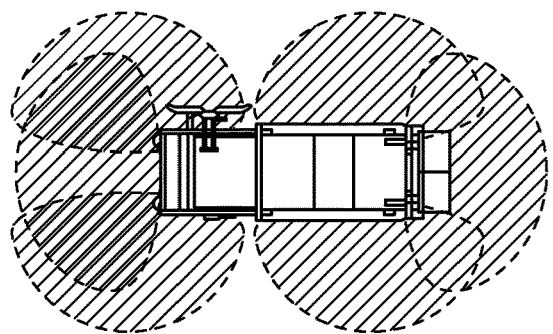
Figure 7A:
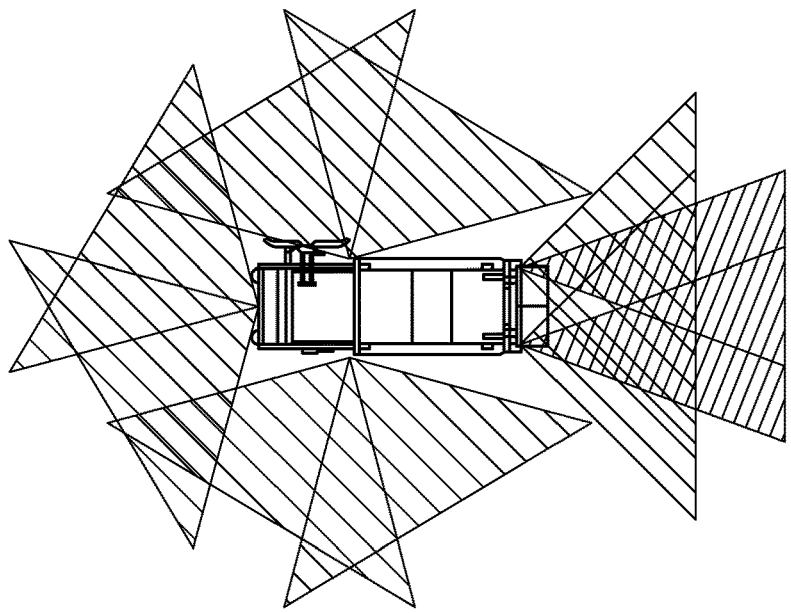
Figure 8C:
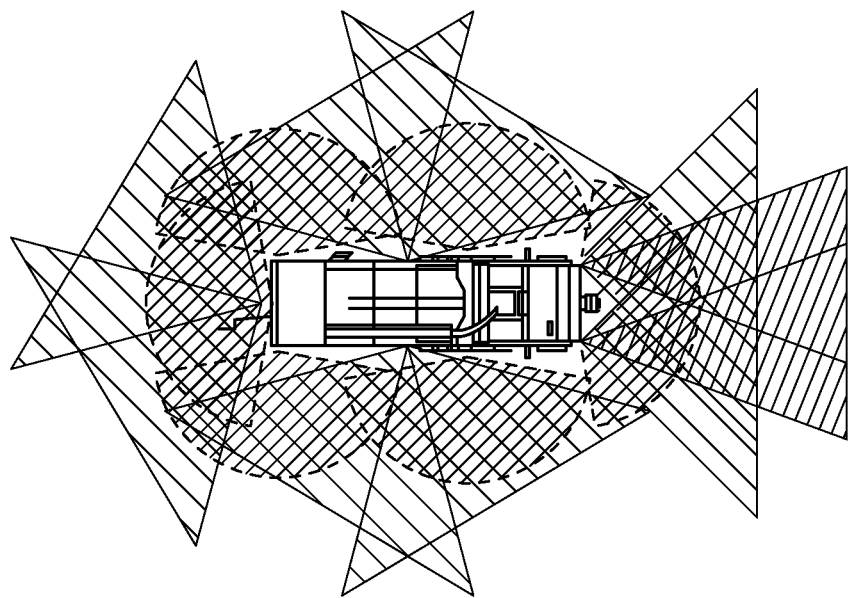
FIGS. 8A-8C are top views of the refuse vehicle of FIG. 1C with spatial awareness, illustrating the coverage zones of the sensors and cameras, according to an exemplary embodiment.
Figure 8B:
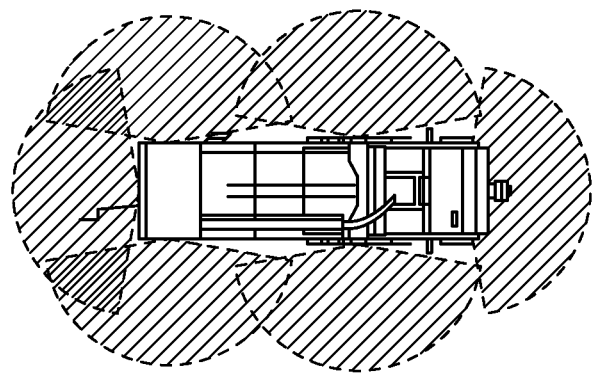
Figure 8A:
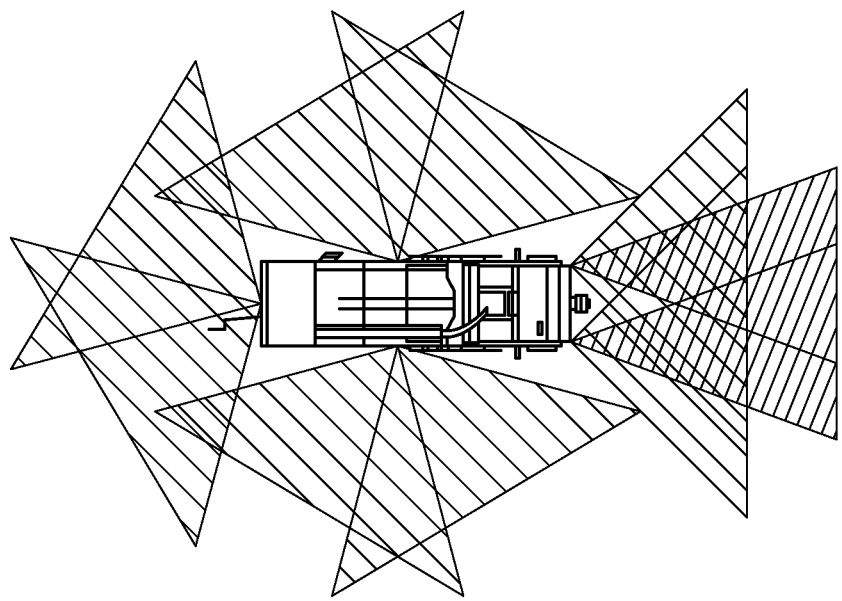

As shown in FIGS. 7A-7C and 8A-8C, refuse vehicles configured as a side-loading refuse vehicle as shown in FIGS. 7A-7C, and refuse vehicles configured as a rear-loading refuse vehicle as shown in FIGS. 8A-8C, may also include sensors and sensing arcs as described with reference to FIGS. 6A-6C. It will be appreciated that the configurations shown in FIGS. 6A-8C illustrate example configurations of the refuse vehicle 10 and are not intended to be limiting. As described above, the refuse vehicle 10 is configured in any number of front, side, and/or rear-loading configurations, with any type of lift and/or grabber assembly for engaging a commercial or residential refuse can, and any combination of the sensor(s) 602 and the sensing arcs 610 and 612.

Figure 9:
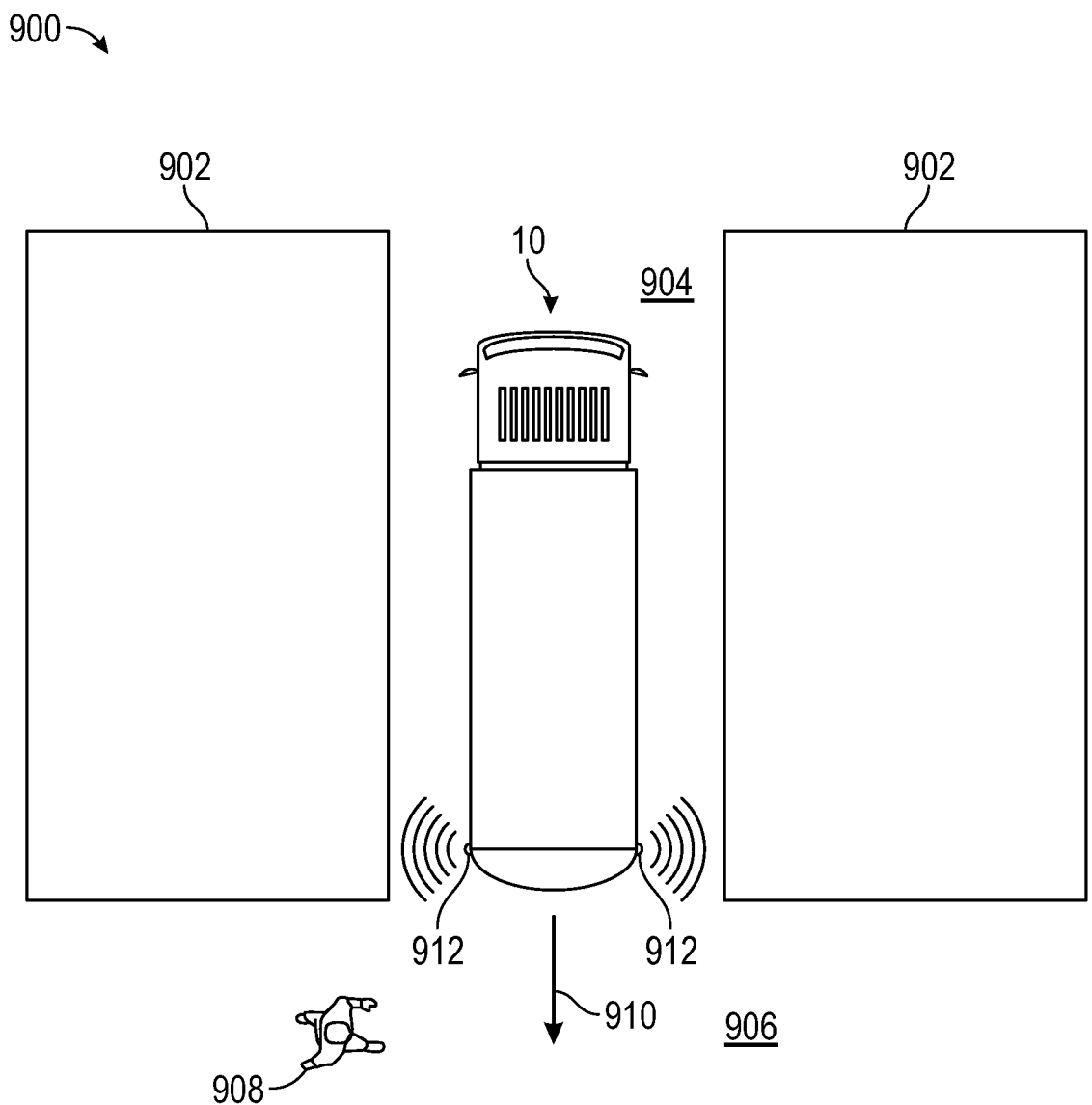
FIG. 9 is a top view of the refuse vehicle of FIG. 1A with spatial awareness, according to an exemplary embodiment.

According to the exemplary embodiment shown in FIG. 9, a refuse vehicle 10 with spatial awareness, outfitted with a controller and at least one sensor as described above is shown in scenario 900. Scenario 900 illustrates backing out of a blind corner, and includes the refuse vehicle 10 with sensors 912 in a first region 804 between barriers 902 traveling in a direction 910 into a second region 906. In some embodiments, barriers 902 are structural obstacles (e.g., walls, buildings, etc.) and first region 904 is an alley. In some embodiments, second region 906 is an open space (e.g., free of barriers 902, etc.) that includes various obstacles (e.g., people, vehicles, trashcans, etc.). For example, second region 906 may include obstacles, shown as pedestrian 908. In some embodiments, the obstacles may be any other object that is detected by the sensor(s) 912. In some embodiments, an operator of vehicle 10 cannot see the obstacles such as pedestrian 908 using conventional blind spot aides (e.g., mirrors, etc.).

In some embodiments, the sensor(s) 612 are configured to detect obstacles such as pedestrian 908. The sensor(s) 612 are positioned on a rearward portion of the refuse vehicle 10. For example, the sensor(s) 612 may be positioned on the sides of tailgate 34. Additionally or alternatively, the sensor(s) 612 may be positioned elsewhere. For example, the sensor(s) 612 may be positioned on a top of the refuse vehicle 10 It should be understood that the sensor(s) 612 may be positioned anywhere on the refuse vehicle 10. In some embodiments, the sensor(s) 612 are integrated with controller described above with reference to FIGS. 4 and 5 as part of a spatial awareness system for refuse vehicle 10. The sensor(s) 612 may become active in response to a condition of the refuse vehicle 10. For example, in scenario 900 the sensor(s) 612 may activate in response to the refuse vehicle 10 being put into a reverse gear and reversing from first region 904 into second region 906.

In brief summary, a refuse vehicle 10 with spatial awareness may operate according to the following example illustrated in scenario 900. An operator of the refuse vehicle 10 puts the refuse vehicle 10 in a reverse gear, and in response, the controller (e.g., controller 500 not shown) and sensor(s) (e.g., sensors 422 or sensor(s) 520) shown as sensor(s) 612, activate. The sensor(s) 612 collect data that may indicate the presence of obstacles around the refuse vehicle 10 and send the data to the controller. In some embodiments, the controller is configured to classify the obstacles. For example, the obstacle detector 516 of the controller 500 may classify an obstacle as a static obstacle or a dynamic obstacle. In some embodiments, the controller determines a sub-classification for an obstacle. For example, the obstacle detector 516 may determine obstacle 908 is moving and therefore a dynamic obstacle, and further that its subclass is a pedestrian. In some embodiments, the spatial awareness system reclassifies an obstacle after a change in an aspect of the obstacle. For example, a dynamic obstacle that comes to a stop may be reclassified as a static obstacle. In some embodiments, the spatial awareness system determines a risk associated with the obstacle. For example, the spatial awareness system may highlight a medium risk obstacle in a yellow box on a user display and highlight a high-risk obstacle in a red box on the user display. In some embodiments, sensor(s) 612 determine other characteristics associated with an obstacle. For example, sensor(s) 612 may determine a speed and direction of travel of an obstacle. In some embodiments, the controller of the refuse vehicle with spatial awareness predicts a path of an obstacle based on the speed and direction of travel of the obstacle. In some embodiments, the controller uses machine-learning techniques to classify obstacles and/or predict their location. For example, the spatial awareness system may label a high-speed obstacle as high risk and a low-speed obstacle as low risk.

Still referring to the operation of refuse vehicle 10 with spatial awareness in scenario 900, the operator may reverse the refuse vehicle 10 in direction 910. The sensor(s) 612 may determine the presence of pedestrian 908 and alert the operator. For example, the controller may display a graphic on a user interface in refuse vehicle 10 (not shown) for the operator. In some embodiments, the alert is an auditory alert (e.g., a beep, etc.). In some embodiments, in a semi-autonomous or autonomous mode, the spatial awareness system automatically limits the movement of the refuse vehicle 10 to avoid contact with pedestrian 908. For example, the spatial awareness system may, upon detection of pedestrian 908 operate various vehicle systems 534 (e.g., brakes, not shown). In some embodiments, the spatial awareness system first displays an alert, but unless the alert is addressed by an operator of the refuse vehicle 10, the spatial awareness then initiates a follow up or successive control action.

Figure 10:
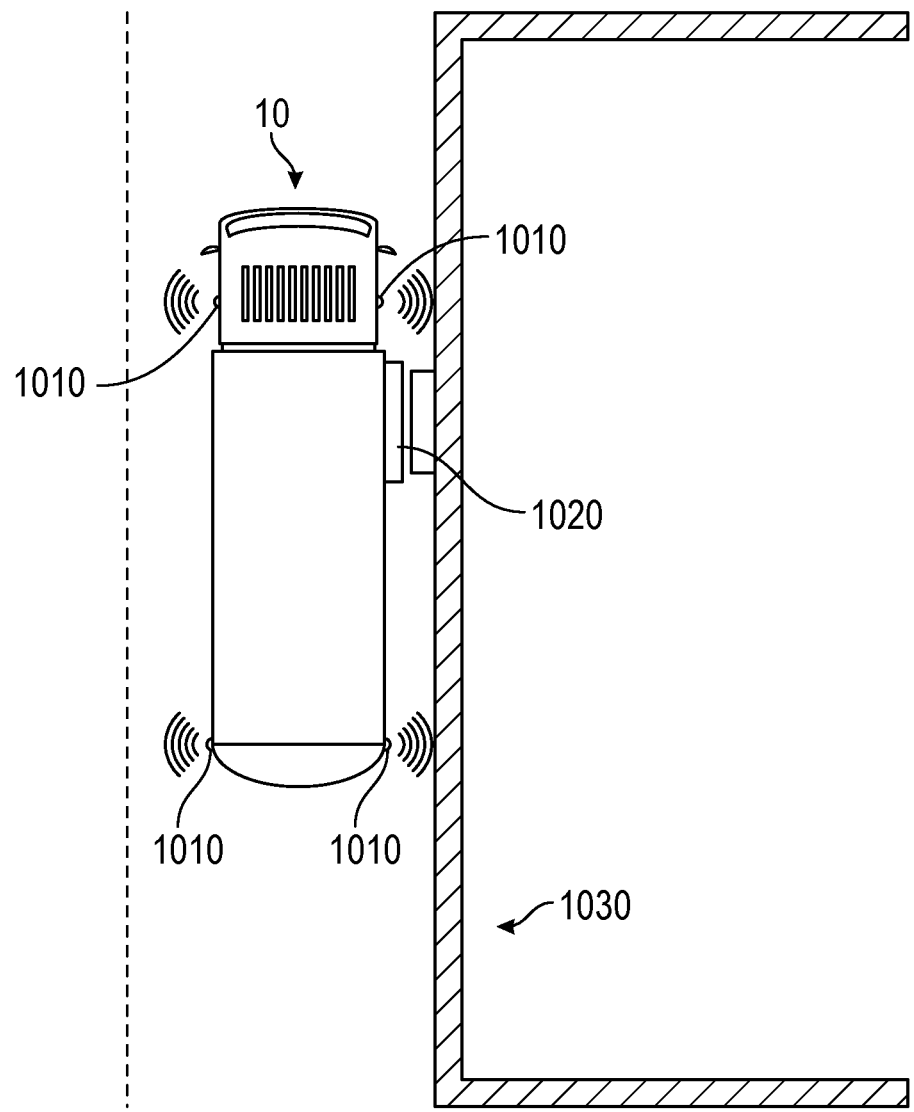
FIG. 10 is a top view of the refuse vehicle of FIG. 1B with spatial awareness, according to another exemplary embodiment.

According to the exemplary embodiment shown in FIG. 10, a refuse vehicle 10 with spatial awareness is shown in scenario 1000. Scenario 1000 includes the refuse vehicle 10 in a side-loader configuration as shown in FIG. 1B with a side-lift assembly, shown as side-lift assembly 1020, and sensors shown as sensors 1010. It should be appreciated the refuse vehicle 10 may be configured in any number of front, side, and/or rear loading configurations and scenario 1000 is not intended to be limiting. The refuse vehicle 10 in scenario 1000 is shown with sensor(s) 1010 at the front and rear corners. Sensor(s) 1010 may alternatively and/or additionally be placed elsewhere on the refuse vehicle 10. Scenario 1000 illustrates the refuse vehicle 10 adjacent to a barrier, shown as barrier 1030. In some embodiments, barrier 1030 is limited to being in a blind spot of the refuse vehicle 10. The sensor(s) 1010 on the refuse vehicle 10 with spatial awareness are configured to detect barrier 1030 and provide data to a controller (e.g., controller 400, controller 500). In some embodiments, controller is configured to limit the operation of the side-lift assembly 1020 when barrier 1030 is detected. For example, the controller may not allow an operator of the refuse vehicle 10 to operate the side-lift assembly 1020 within a set distance of the barrier 1030. The distance may be based off of dimensions of the refuse vehicle 10 and/or the side-lift assembly 1020. In some embodiments, the distance may be a default minimum distance. In some embodiments, an operator sets the distance. In some embodiments, the distance is calculated by the controller using data provided by the sensor(s) 1010 and machine learning techniques.

In some embodiments, the controller does not initiate a control action until an object is a minimum distance from the refuse vehicle 10. For example, the controller may generate an alert for an operator based on the distance between the side-lift assembly 100 and the barrier 1030. The controller may generate a low volume alert when the side-lift assembly is four feet from the barrier 1030, and a high volume alert when the side-lift assembly 100 is two feet from the barrier 1030. In some embodiments, the controller generates an alert and controls an aspect of the refuse vehicle 10 and/or the side-lift assembly 100. For example, the controller may generate an audible alert but not limit control of side-lift assembly 100 when it is four feet from the barrier 1030. The controller may however generate an audible alert and limit control of the side-lift assembly 100 when it is two feet from the barrier 1030. In some embodiments, the controller does not initiate a control action until an object is a minimum distance from the refuse vehicle 10. For example, the controller may allow the side-lift assembly 100 to operate until 6 inches of distance is between the side-lift assembly 100 and the barrier 1030, at which point the controller stops the movement of side-lift assembly 100. It should be appreciated that the minimum distance may be any desired distance between the refuse vehicle 10 and the detected obstacle and the examples given are not intended to be limiting.

Figure 11:
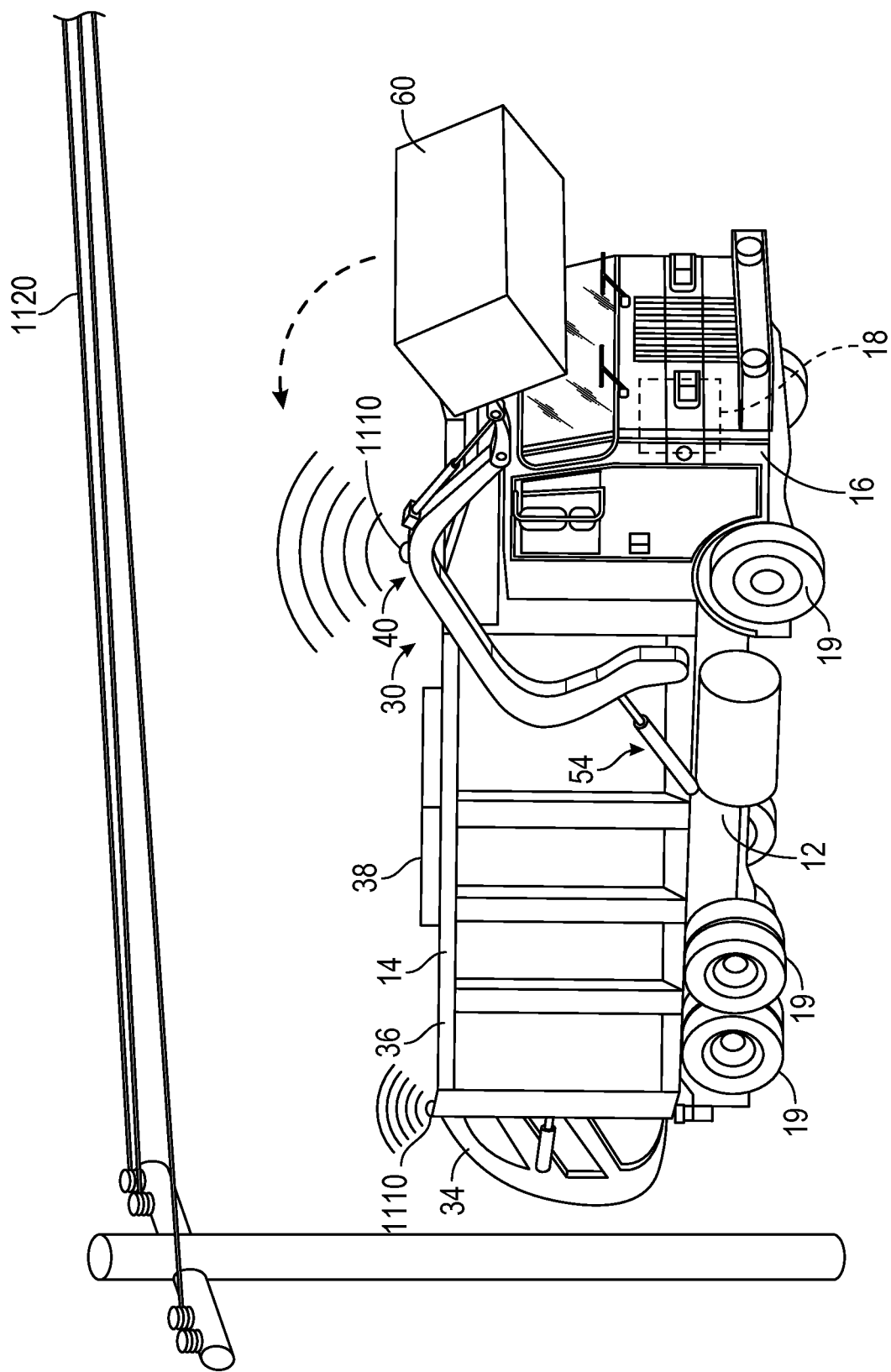
FIG. 11 is a perspective view of a refuse vehicle with spatial awareness, according to an exemplary embodiment.

According to the exemplary embodiment shown in FIG. 11, a refuse vehicle 10 with spatial awareness is shown in scenario 1100. Scenario 1100 includes the refuse vehicle 10 in a front-loader configuration as shown in FIG. 1A with front-lift assembly 40. The refuse vehicle 10 in scenario 1100 has sensors, shown as sensor(s) 1110 on its top. Scenario 1100 illustrates a refuse vehicle 10 underneath an obstacle shown as power lines 1120. In some embodiments, power lines 1120 is in blind spot of the refuse vehicle 10.

In some embodiments, the controller initiates a control action upon detection of power lines 1120. For example, the controller may generate an alert for an operator of the refuse vehicle 10 indicating the presence and/or location of the power lines 1120. The controller may display a graphic on a user interface for the operator indicating the presence and/or location of power lines 1120. In some embodiments, the user interface displays a distance between the refuse vehicle 10 and power lines 1120. The distance may be displayed numerically. In some embodiments, the user interface displays the distance graphically with a digital representation of the refuse vehicle 10 and power lines 1120.

In some embodiments, the controller determines the trajectory 1430 of refuse container 60 based on information regarding the range of motion and/or path of front-lift assembly 40, the trajectory 1430 described above with reference to FIG. 4. In some embodiments, the controller is configured to detect the power lines 1120 within the path of trajectory 1430. For example, the controller may detect power lines 1120 within the trajectory 1430 of refuse container 60 and front-lift assembly 40 of the refuse vehicle 10. In some embodiments, the controller initiates a control action in response to detecting an power lines 1120 within trajectory 1430 in order to avoid the detected obstacle. For example, the controller is configured to automatically stop the motion of front-lift assembly 40 to avoid power lines 1120. In some embodiments, the controller moves the refuse vehicle 10 so that the detected obstacle is no longer within the trajectory of front-lift assembly 40. In some embodiments, the controller additionally and/or alternatively generates an alert to an operator of the refuse vehicle 10. In some embodiments, the controller only generates an alert. In some embodiments, the controller generates an alert and/or another action such as a control action to control the refuse vehicle 10 or various vehicle systems 534. In some embodiments, the alert includes the presence and/or position of the detected obstacle. In some embodiments, the alert contains a suggested control action. For example, the alert may include the position of power lines 1120 and suggest to an operator that the operator cease operation of front-lift assembly 40. In some embodiments, the controller initiates a control action including control of the refuse vehicle 10 and/or the vehicle systems 534 before an alert. In some embodiments, it initiates control of the refuse vehicle 10 and/or the vehicle systems 534 after an alert.

Still in reference to FIG. 11, in some embodiments the controller monitors the motion of the refuse vehicle 10 and/or a lift assembly, shown as front-lift assembly 40, for errors in operation. For example, based on information regarding the range of motion of front-lift assembly 40, the controller may monitor front-lift assembly 40 as it lifts a refuse container 60 to ensure that front-lift assembly 40 is operating as expected. In some embodiments, a minimum or maximum speed is given. For example, the controller may detect the speed of front-lift assembly 40, if front-lift assembly 40 is operating at a speed above the maximum speed, the controller is configured to initiate a control action such as a command to front-lift assembly 40 to stop. In some embodiments, the control action is an alert to an operator of the refuse vehicle 10. In some embodiments, the control action includes stopping front-lift assembly 40 mid-lift.

Figure 12B:
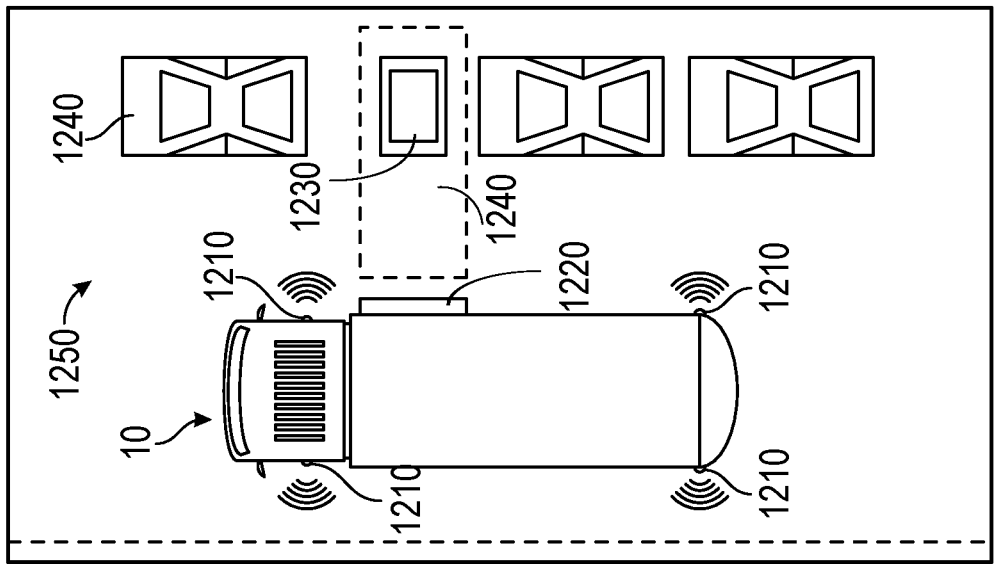
FIGS. 12A and 12B are example scenarios from a top view of the refuse vehicle of FIG. 1B with spatial awareness, according to an exemplary embodiment.
Figure 12A:
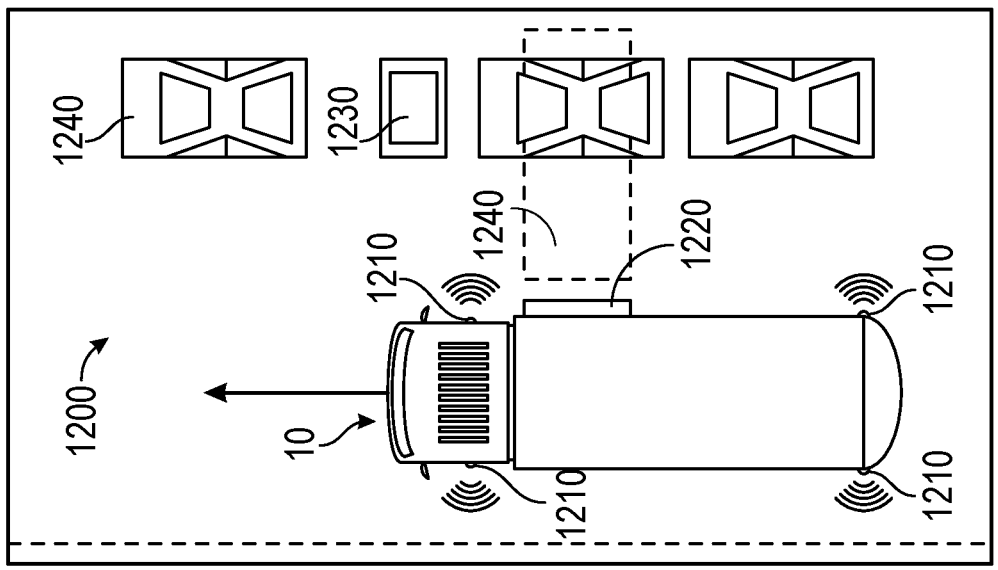

According to the exemplary embodiments shown in FIGS. 12A and 12B, a refuse vehicle 10 with spatial awareness is shown in scenarios 1200 and 1250. As shown in FIG. 12A, scenarios 1200 and 1250 illustrate retrieving a refuse container, shown as refuse container 1230, curbside adjacent to other obstacles, shown as vehicles 1240. In some embodiments, the obstacles include other obstacles such as people, trashcans, buildings, fences, etc. In some embodiments, the refuse container 1230 is disposed between vehicles 1240 so as to be accessible from only a limited area. In some embodiments, the refuse vehicle 10 includes sensors, shown as sensor(s) 1210. The sensor(s) 1210 are configured to detect objects such as vehicles 1240 and refuse container 1230. The sensor(s) 1210 may be positioned on the rear and front of the refuse vehicle 10. In some embodiments, sensors are positioned on the side of the refuse vehicle 10. In some embodiments, the sensor(s) 1210 are positioned as shown in FIGS. 6A-6C.

In some embodiments, the controller generates alerts based on the position of refuse container 1230 and the refuse vehicle 10. For example, referring now specifically to FIG. 12A, the refuse vehicle 10 traveling in direction 1210 may pull alongside vehicles 1240. As shown in FIG. 12A the refuse vehicle 10 may be positioned so that the side-lift assembly 1220 is not properly aligned with the refuse container 1230 as indicated by area 1240.

In the exemplary embodiment shown in FIG. 12A the sensor(s) 1210 detect the vehicles 1240 and, through the process of classifying and sub-classifying obstacles as described above, determine they are vehicles and not refuse container 1230. The controller then initiates a control action if an operator attempts to activate the side-lift assembly 1220. In some embodiments, the controller generates an alert to the operator. For example, the alert may indicate that no refuse container is detected. In some embodiments, the alert also contains information regarding what if any other control action the controller initiated. For example, the alert may notify an operator that no refuse container is detected and that the side-lift assembly 1220 was deactivated.

Still referring to FIG. 12A, in some embodiments the controller detects the refuse container 1230 as the refuse vehicle 10 travels in direction 1210. In some embodiments, the controller generates an alert indicating the refuse container 1230 is detected and the distance between the refuse vehicle 10 and the refuse container 1230. In some embodiments, the alert contains the position of the refuse vehicle 10. In some embodiments, aspects of the alert depend on the distance between the refuse vehicle 10 and refuse container 1230. For example, the controller may generate a first audible alert for operator of the refuse vehicle 10 at a first distance from refuse container 1230 and generate a second alert of a higher pitch at a second, smaller distance from refuse container 1230, indicating the refuse vehicle 10 is closer to refuse container 1230 then at the time of the previous alert. In some embodiments, successive alerts of increasing pitch are generated by the controller as the refuse vehicle 10 approaches refuse container 1230. Additionally or alternatively, the distance between the refuse vehicle 10 and refuse container 1230 may be indicated by alerts that increase in frequency as the distance decreases. In some embodiments, the alerts additionally or alternatively are visual alerts on user interface 420 in cab 16 of the refuse vehicle 10 (not shown). It should be noted that the various aspects of the alerts that depend on the distance between the refuse vehicle 10 and the detected obstacle may differ according to other exemplary embodiments, and that such variations are intended to be encompassed by the present disclosure.

Referring now to the exemplary embodiment shown in FIG. 12B, the alerts continue until the side-lift assembly 1220 is in a position that it is able to access refuse container, at which point the controller generates an alert indicative of the alignment. For example, the frequency of the alerts may increase until a constant tone is heard. Such systems may facilitate single-operator operation of the refuse vehicle 10. It will be appreciated that any number and type of auditory or graphical alerts may be generated to facilitate alignment of side-lift assembly 1220 with refuse container 1230.

Figure 13:
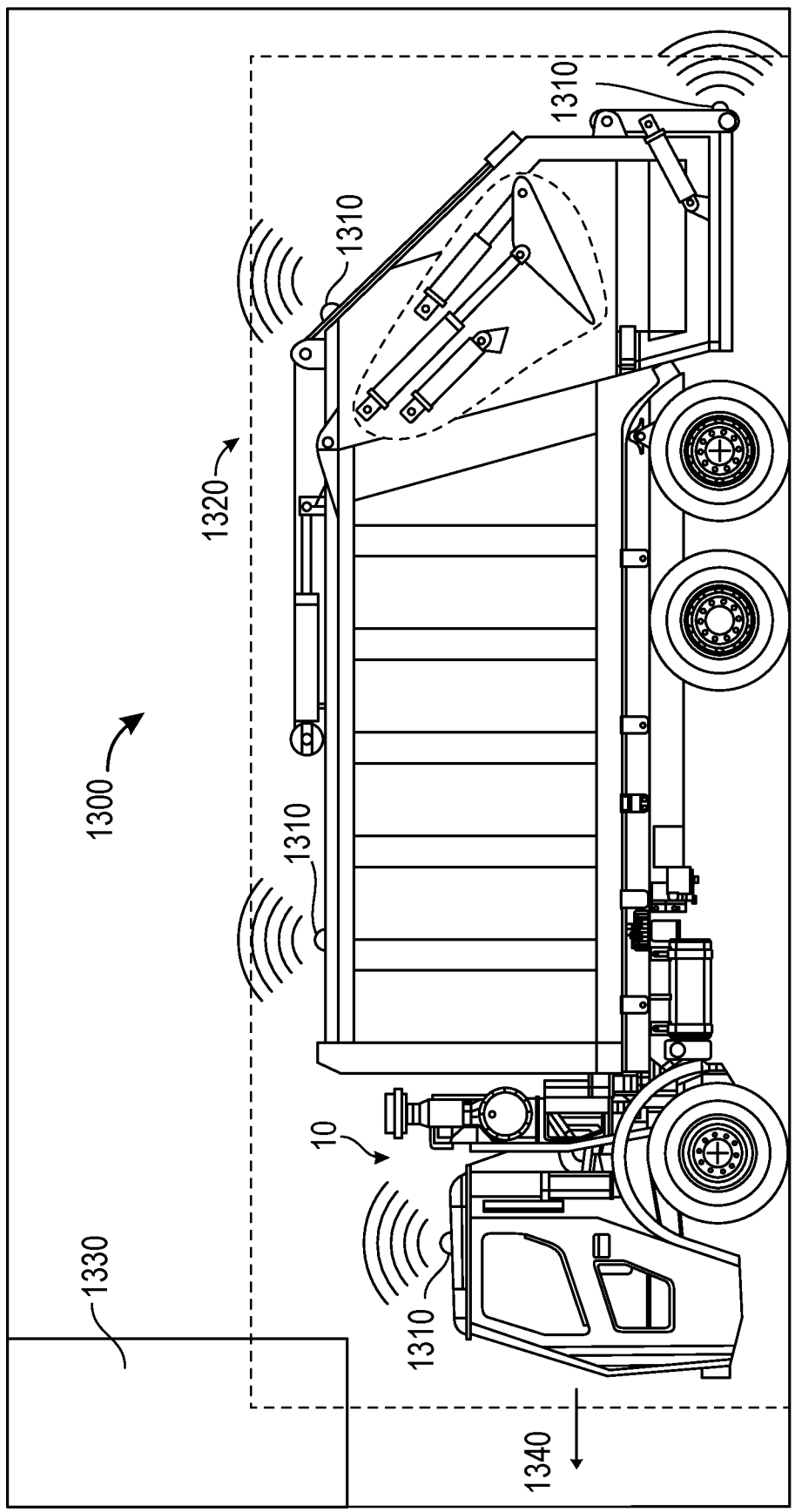
FIG. 13 is a side view of the refuse vehicle of FIG. 1C with spatial awareness, according to some embodiments.

According to the exemplary embodiment shown in FIG. 13, a refuse vehicle 10 with spatial awareness is shown in scenario 1300. Scenario 1300 includes a refuse vehicle 10 outfitted with sensors, shown as sensor(s) 1210, and a controller (e.g., controller 400, controller 500, etc. not shown). Scenario 1300 includes the refuse vehicle 10 configured as a rear-loading refuse vehicle as shown in FIG. 1C, with a safety zone 1320 shown. As described above in reference to FIG. 4, in some embodiments, safety zone 1320 extends beyond the refuse vehicle 10 to include its immediate surroundings. In some embodiments, safety zone 1320 extends to include the entire sensing arcs of sensor(s) 1210 as shown in FIGS. 6A-8C. For example, with reference now to FIGS. 6A-6C, the safety zone may extend to cover the area covered by sensing arcs 610 and 612. In some embodiments, safety zone 1320 encompasses a subset of the area covered by sensing arcs 610 and 612. For example, safety zone 1320 may be limited to blind spots that are not visible to an operator of the refuse vehicle 10 from cab 16.

In some embodiments, scenario 1300 illustrates the refuse vehicle 10 underneath a barrier, shown as barrier 1330. Barrier 1330 may be a parking structure, overhang, bridge, bypass, or any other obstacle that may be above the refuse vehicle 10. In scenario 1300 the refuse vehicle 10 is traveling along direction 1340 towards and under barrier 1330. In some embodiments, barrier 1330 is located in a blind spot that is an area that cannot be seen by an operator of the refuse vehicle 10. In some embodiments, the sensor(s) 1210 are positioned on the top of the refuse vehicle 10. For example, the sensor(s) 1210 may be placed on top of the refuse vehicle 10 at the front and rear of the vehicle and detect obstacles.

In some embodiments, the sensor(s) 1210 detect barrier 1330 and the controller initiates a control action when barrier 1330 enters safety zone 1320. In some embodiments, the control action includes generating an alert to the operator of the refuse vehicle 10 indicating the presence of obstacles 908 above the refuse vehicle 10. In some embodiments, the control action additionally and/or alternatively includes controlling an aspect of the refuse vehicle 10. For example, the control action may include limiting the movement of the refuse vehicle 10 so as to prevent it from coming into contact with barrier 1330. For example, as the refuse vehicle 10 approaches barrier 1330 the controller may automatically stop the movement of the refuse vehicle 10 as barrier 1330 enters safety zone 1320. The controller may detect barrier 1330 and initiate a control action that includes generating an alert including an alarm indicating the presence of barrier 1330 to the operator of the refuse vehicle 10. As a further example, the refuse vehicle 10 may not be operable until an operator clears the alert indicating the presence of barrier 1330.

Figure 14:
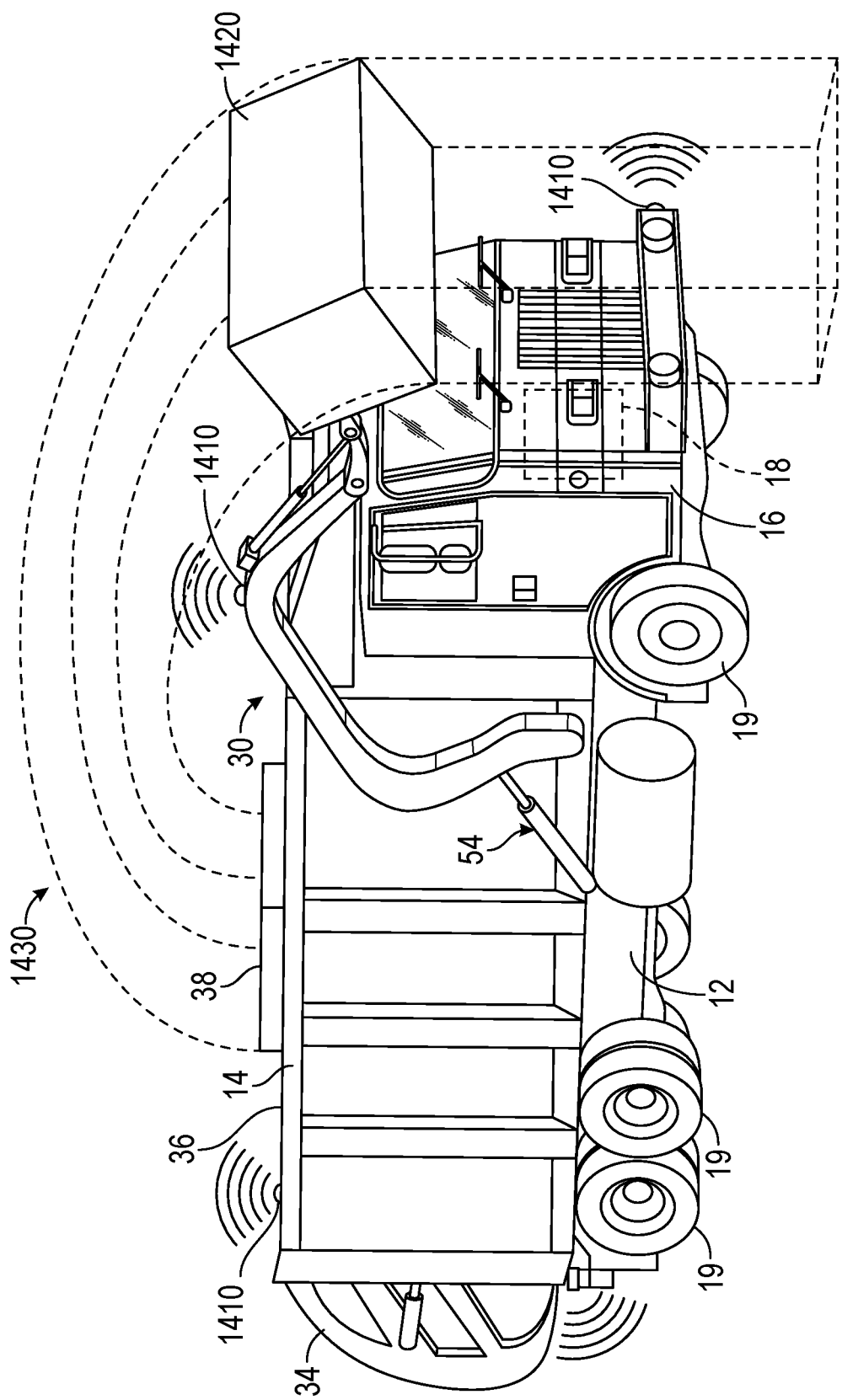
FIG. 14 is a perspective view of a refuse vehicle with spatial awareness illustrating the generated trajectory of a refuse can, according to some embodiments.

According to the exemplary embodiment shown in FIG. 14, a refuse vehicle 10 with spatial awareness is shown. FIG. 14 illustrates a trajectory, shown as trajectory 1430 of a front-lift assembly of refuse vehicle 10 that may be generated by the controller (e.g., controller 400, controller 500) within refuse vehicle 10. As described above in detail with reference to FIG. 4, the trajectory 1430 may be generated by the controller based on known aspects of the refuse vehicle 10. For example, the refuse vehicle 10 may be provided with the range of motion of front-lift assembly through the network. In some embodiments, the trajectory is based on data from the sensor(s) 1410. In some embodiments, the trajectory 1430 is displayed to an operator through user interface 420 (not shown). In some embodiments, the controller only initiates a control action when an obstacle is detected within trajectory 1430.

According to the exemplary embodiment shown in FIG. 15A, an example interface 1500 illustrating the detection of multiple obstacles for use with a refuse vehicle with spatial awareness is shown. Interface 1500 may be presented via user interface 420. In some embodiments, interface 1500 illustrates the detection of obstacles from data captured by one or more sensor(s) 1510. In some embodiments, the image of interface 1500 represents an input image to obstacle detector of the controller (e.g., obstacle detector 416 of controller 400). The obstacle detector is configured to detect any number of obstacle classes, as described above, including dynamic and static obstacles, sub-classifications such as pedestrians and refuse containers. In some embodiments, obstacle detector additionally and/or alternatively assigns risks associated with obstacles and/or the obstacle classes.

Interface 1500 includes a top-down view of the refuse vehicle 10 and various detected obstacles. As shown in FIG. 15A, dynamic obstacle 1520, static obstacle 1540 and pedestrian 1570 are detected (e.g., by obstacle detector 416 of controller 400). Dynamic obstacle 1520 is surrounded by bounding box 1530. Static obstacle 1540 is behind the refuse vehicle 10 and surrounded by bounding box 1550. Pedestrian 1570 is surrounded by bounding box 1580. Each of the detected obstacles is surrounded by corresponding bounding boxes indicating the obstacle within interface 1500 (bounding boxes 1530, 1550, and 1580). As described with reference to FIGS. 4 and 5 above, the controller may display the bounding boxes in various colors, shapes, and/or sizes corresponding to the object class and/or the risk associated with the obstacle through a user interface (e.g., user interface 420, user interface 532). For example, as described above in reference to FIG. 4, bounding box 1530 surrounding dynamic obstacle 1520 may be colored red indicating a high-risk obstacle, while bounding box 1550 surrounding static obstacle 1540 may be yellow indicating a low-risk obstacle. In some embodiments, the controller indicates the class and/or level of risk associated with a detected obstacle through other means such as alternate graphical representations, audible alerts, and text alerts. It should be noted that the indication of various obstacles and their associated level of risk may differ according to other exemplary embodiments, and that such variations are intended to be encompassed by the present disclosure.

Another example interface, interface 1500 is shown in FIG. 15B illustrating the detection of multiple obstacles, according to some embodiments. FIG. 15B illustrates an example of a user interface presented to a user of controller 500 and/or the refuse vehicle 10. Interface 1500 may be presented via user interface 420. In some embodiments, interface 1500 represents an alternative configuration of interface 1500.

As shown, interface 1500 includes a top-down view of a path being traversed by the refuse vehicle 10. In this example, interface 1500 presents a graphical representation of a roadway. In some embodiments, interface 1500 does not include an illustration of the path and only indicates a position of a refuse container 1590 with respect to the refuse vehicle 10. Also shown in FIG. 15B is safety zone 1542, static obstacle 1540, and bounding box 1550 surrounding static obstacle 1540. Safety zone 1542 may be any shape. In some embodiments, safety zone 1542 is not be displayed on interface 1500. In some embodiments, safety zone 1542 is only displayed when a detected obstacle approaches. For example, as the refuse vehicle 10 travels along path 1544, safety zone 1542 may appear after static obstacle 1540 is detected. In some embodiments, similar to interface 1500, bounding box 1550 surrounding static obstacle 1540 is colored according to the level of risk associated with static obstacle 1540. It will be appreciated that interface 1500 may include any number of additional graphical elements to facilitate the selection and retrieval of a refuse can. For example, interface 1500 may include additional buttons, menus, icons, image, etc.

In some embodiments, interface 1500 is generated from aerial or satellite images of a location of the refuse vehicle 10. For example, satellite imagery may be retrieved via a network based on a determined location of the refuse vehicle 10. In this example, the location of the refuse vehicle 10 may be determined based on GPS coordinates, triangulation (e.g., via a cellular network), or by any other methods for determining a location. In other embodiments, interface 1500 is generated from images captured by sensor(s) 1510 located at various points around the refuse vehicle 10. In some embodiments, multiple images or data are combined from sensor(s) 1510 to form a panoramic or top-down view of the area around the refuse vehicle 10. In yet other embodiments, the background (e.g., the roadway) of interface 1500 is a generated graphical element.

As illustrated in FIG. 15B, the controller may detect obstacles surrounding the refuse vehicle 10 and plot a path, shown as path 1544 towards refuse container 1590. In some embodiments, the operator commands the controller to operate as a park-assist system. For example, as shown in FIG. 15B, the controller may direct the refuse vehicle 10 along path 1544 until the refuse vehicle 10 is at a desired distance to refuse container 1590. In some embodiments, the controller directs the refuse vehicle 10 along path 1544 in an autonomous operation (e.g., where the refuse vehicle 10 is autonomous) in order to reduce or eliminate operator input. In some embodiments, the controller generates an alert indicating refuse container 1590 is detected and/or that a path is available to reach it. In some embodiments, the controller only initiates park-assist and/or autonomous driving based on a user input. For example, an alert may indicate available path 1544 and ask an operator for permission to control the refuse vehicle 10 along said path.

According to the exemplary embodiment shown in FIG.>16, a process 1600 for detecting an obstacle from captured sensory data is shown. Process 1600 may be a process implemented by a controller of a refuse vehicle (e.g., the refuse vehicle 10) for detecting one or more obstacles from data captured by sensors disposed at various locations around the refuse vehicle. Process 1600 may be implemented by controller 400 and/or controller 500, as described above, for example.

At step 1602, data is received from one or more sensors (e.g., sensor(s) 422) positioned at various locations of a refuse vehicle. In some embodiments, data is received from at least a radar and a camera sensor. Received data may include raw data from one or more cameras (e.g., visible light cameras) and/or data from one or more sensors (e.g., LIDAR, radar, etc.), as described above. In some embodiments, the data includes still images, video, or other data that can be used to detect an object or objects. In some embodiments, the received data includes at least raw image data and LIDAR data. As described above with respect to FIG. 9, data may be captured from one or more sides of a refuse vehicle, in order to detect obstacles such as pedestrians that are within blind spots of a refuse vehicle.

At step 1604, the data is inputted into a controller, such as the controller described above with reference to FIGS. 4 and 5.

At step 1606, a determination is made if an obstacle is detected. In some embodiments, the controller processes the data to detect one or more obstacles in an area surrounding the entire refuse vehicle. In some embodiments, the controller only detects obstacles within a safety zone (as shown in FIG. 13). If an obstacle is detected, process 1600 proceeds to step 1608. If an obstacle is not detected, process 1600 returns to step 1602.

At step 1608, the controller classifies an obstacle. In some embodiments, the controller classifies an obstacle as static or dynamic. For example, the controller may classify a moving obstacle as dynamic and a stationary obstacle as static. In some embodiments, the controller applies sub-classifications to an obstacle (e.g., pedestrian, refuse container, car, etc.).

At step 1610, the controller determines the position of an obstacle. In some embodiments, the controller determines a speed and direction of travel for an obstacle in addition to determining the position of an obstacle. In some embodiments, the controller determines the position and/or speed and direction of an obstacle using secondary information (e.g., satellite or GPS location information provided over network 528) in addition to data from the one or more sensors. In some embodiments, the controller determines a risk associated with an obstacle. In some embodiments, the risk is associated with an obstacles position and/or speed. For example, a controller may classify a nearby slow-moving obstacle as a high-risk, and a distant slow-moving obstacle as a low risk. It should be appreciated by those skilled in the art who read the present application that the risk may be determined by considering at least one of the position, speed, and direction of travel or any combination thereof, and that the combinations listed are merely exemplary and are not intended to be limiting. The risk may also be determined with reference to the refuse vehicle and its position, speed, and direction of travel. The output of the controller may be an indication of an obstacle, its classification, its sub-classification, and/or the risk associated with it (e.g., a red bounding box for a high-risk obstacle).

At step 1612, a response is initiated based on the detection and/or classification of an obstacle. The response may include any number of automated control actions. For example, the response may include presenting a notification or alert of a detected pedestrian in a blind spot to an operator via a user interface (e.g., user interface 420). As another example, the control action(s) may include automatically moving the refuse vehicle and/or systems of the refuse vehicle to avoid the obstacle. The control actions initiated by step 1612 are described in detail above.

Figure 17:
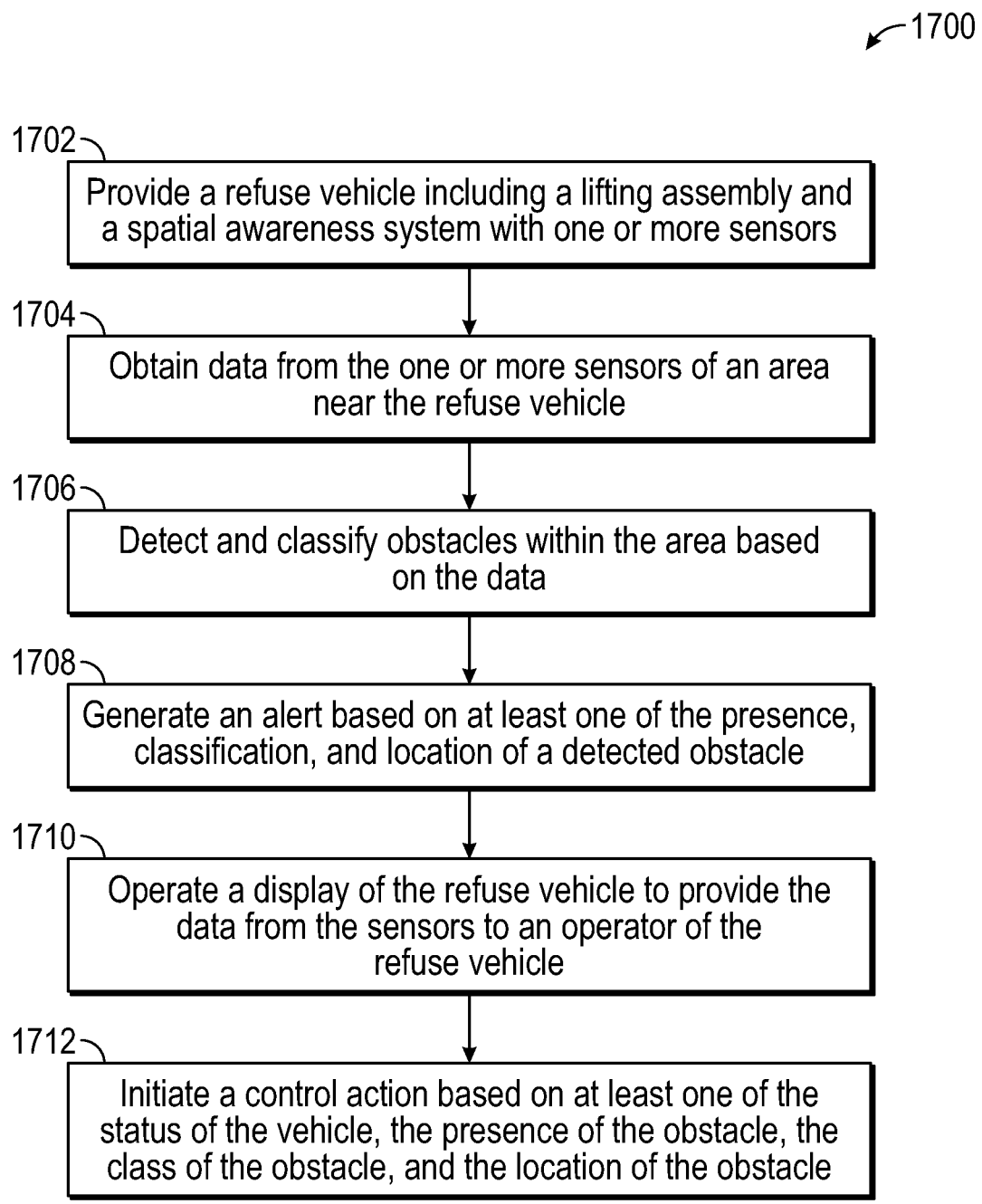
FIG. 17 is a process for initiating a control action based on detecting an obstacle, according to some embodiments.

According to the exemplary embodiment shown in FIG. 17, a process 1700 for detecting an obstacle from captured sensor data is shown. Process 1700 illustrates how a controller initiates multiple control actions based upon the detection of an obstacle. Process 1700 may be a process implemented by a controller of a refuse vehicle (e.g., the refuse vehicle 10) for detecting one or more obstacles from data captured by sensors disposed at various locations around the refuse vehicle. Process 1700 may be implemented by controller 400 and/or controller 500, as described above, for example.

At step 1702, a refuse vehicle including a lift assembly is provided with a spatial awareness system, including a and a controller (e.g., controller 400, controller 500, etc.) and with one or more sensors (e.g., sensor(s) 422 etc.). As described above, the refuse vehicle may be a front-lifting, side-lifting, or rear-loading refuse vehicle. The one or more sensors may be coupled to the refuse vehicle at any point to facilitate detection of obstacles. In some embodiments, the sensors are facilitated to detect obstacles in an operator's blind spot.

At step 1704, the sensors are employed to collect data about the area near the refuse vehicle. The area may be limited to blind spots of the refuse vehicle. In some embodiments, the area includes the entire sensing arc of the sensors. In some embodiments, the area may be represented by a safety zone that extends around the perimeter of the refuse vehicle. In some embodiments, the area may only cover a portion of the refuse vehicle. For example, the sensors may be positioned so as to sense behind a refuse vehicle.

At step 1706, an obstacle is detected and classified based on data provided by the one or more sensors. As described above, the data may be any type of data than can be collected from the sensors provided. For example, the data may be proximity data from a radar sensor as shown in FIGS. 6A-8C. As described above, the controller may classify objects as static or dynamic based on their movement. The controller may also and/or alternatively classify an obstacle based on object recognition. For example using image data the controller may classify an obstacle as a pedestrian. In some embodiments, the controller performs object detection using machine learning and/or deep learning techniques.

At step 1708, process 1700 is shown to include generating an alert based on at least one of the presence, classification, or location of a detected obstacle. In some embodiments, the alert informs an operator of the presence of a detected obstacle. In some embodiments, the alert includes information regarding the location of the obstacle. For example, referring now to FIG. 11 the alert may indicate to an operator that power lines 1120 are overhead. In some embodiments, the alert indicates the classification of an obstacle. For example, the alert may warn an operator of a pedestrian behind a refuse truck in a blind spot. In some embodiments, the alert indicates the objects presence, classification, and/location with an audible and/or visual alert. For example, as described above in reference to FIG. 15A, the alert may be a boundary box such as boundary box 1530 generated around a detected obstacle and displayed to a user through user interface such as user interface 420. The color of the boundary box may indicate the obstacles classification as dynamic or static. In some embodiments, the alert may also indicate the risk associated with an obstacle.

At step 1710, the controller may operate a display of the refuse vehicle to provide data from the one or more sensors to an operator. As explained above with reference to FIGS. 4 and 5, the data from the sensors may pass through the controller to a user interface including a display (e.g., user interface 420, user interface 532, etc.) to be displayed to an operator. Examples of user interfaces or devices include, but are not limited to, mobile phones, electronic tablets, laptops, desktop computers, workstations, and other types of electronic devices. In some embodiments, user interface 420 is a control system (i.e., a control panel) configured to display information to an operator of the refuse vehicle 10 and/or receive user inputs. In one example, user interface 420 includes a touchscreen display panel located in the cab 16 of the refuse vehicle 10 and configured to present an operator with a variety of information regarding the operations of the refuse vehicle 10. User interface 420 may further include a user input device, such as a keyboard, a joystick, buttons, etc.

At step 1712, the controller initiates a control action apart from the alert of step 1708. As described above, the control action may itself be an alert. In some embodiments, the control action is an alert and an action controlling an aspect of the refuse vehicle and its systems. The control action may be based on at least one of the status of the vehicle, the presence of the obstacle, the class of the obstacle, and the location of the obstacle. As described above in the various embodiments the control action may including controlling the movement of the refuse vehicle and the systems of the refuse vehicle such as an attached lift. For example, the control action may include preventing the movement of the lift assembly when an obstacle is detected within its path (e.g., trajectory 1430). In some embodiments, the control action prevents movement of the refuse vehicle itself. In some embodiments, the control action is based on the risk associated with an obstacle. For example, a controller may provide a low volume alert for low risk obstacle and a high-volume alert for a high-risk obstacle.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures and description may illustrate a specific order of method steps, the order of such steps may differ from what is depicted and described, unless specified differently above. In addition, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle, comprising:
   a chassis;
   a body coupled to the chassis, the body defining a refuse compartment;
   a lift assembly coupled to at least one of the chassis or the body, the lift assembly comprising:
      an attachment interface configured to engage with a refuse container; and
      a positioning assembly coupled to the attachment interface to facilitate positioning of the attachment interface;
   one or more sensors coupled to the body and configured to provide data relating to the presence of an obstacle proximate the refuse vehicle;
   a controller configured to:
      receive the data from the one or more sensors;
      determine, using the data, the presence of the obstacle proximate the refuse vehicle; and
      generate, a trajectory for the lift assembly, the trajectory comprising a first segment between the refuse vehicle and the refuse container and a second segment between the refuse container and the refuse compartment; and
      initiate a control action when the obstacle is detected within the second segment of the trajectory, wherein the control action comprises at least one of controlling the movement of the refuse vehicle, controlling the movement of the lift assembly, or generating an alert.

2. The refuse vehicle of claim 1, wherein the obstacle is not detected within the first segment.

3. The refuse vehicle of claim 1, wherein the second segment is not visible to an operator of the refuse vehicle.

4. The refuse vehicle of claim 1, wherein the obstacle is not positioned between the attachment interface and the refuse container.

5. The refuse vehicle of claim 1, wherein the controller is further configured to:
   control the lift assembly to move along the first segment and engage the attachment interface with a refuse container;
   initiate, after the attachment interface is engaged with the refuse container, the control action, wherein the control action comprises moving the refuse vehicle until the obstacle is no longer detected; and control, after the control action, the lift assembly to move along the second segment.

6. The refuse vehicle of claim 1, wherein the controller is further configured to:

control the lift assembly to traverse the trajectory; and initiate the control action prior to the lift assembly traversing the second segment.

7. The refuse vehicle of claim 1, the controller further configured to:

determine, based on the data, a speed and a direction of travel of the obstacle; and initiate the control action based on at least one of the presence, the speed, or the direction of travel of the obstacle.

8. The refuse vehicle of claim 1, wherein the data further relates to the operation of the lift assembly.

9. The refuse vehicle of claim 8, wherein the trajectory is determined based on at least one of a known range of motion of the lift assembly or the data.

10. The refuse vehicle of claim 1, wherein the controller is further configured to:

control the lift assembly to traverse the trajectory; and initiate the control action after the lift assembly engages with the refuse container.

11. The refuse vehicle of claim 10, wherein the controller is further configured to initiate the control action prior to the lift assembly encountering the obstacle.

12. The refuse vehicle of claim 1, wherein the controller is further configured to associate a risk with the obstacle, the risk based on a determination regarding at least one of the presence, position, speed, or direction of travel of the obstacle.

13. The refuse vehicle of claim 12, wherein the control action is based on the risk associated with the obstacle.

14. A control system for a refuse vehicle comprising:

processing circuitry configured to:

determine a trajectory of a lift assembly coupled to a chassis of the refuse vehicle, wherein the trajectory comprises a first segment between the refuse vehicle and a refuse container and a second segment between the refuse container and a refuse compartment coupled to the chassis;

detect, using one or more sensors coupled to the chassis, an obstacle within the second segment; and initiate a control action including at least one of controlling the movement of the refuse vehicle, controlling the movement of the lift assembly, or generating an alert.

15. The control system of claim 14, wherein the second segment is not visible to an operator of the refuse vehicle.

16. The control system of claim 14, wherein the processing circuitry is further configured to determine the trajectory based on data from the one or more sensors.

17. The control system of claim 14, wherein the processing circuitry is further configured to:

control the lift assembly to move along the first segment and engage the lift assembly with the refuse container;

initiate, after the lift assembly is engaged with the refuse container, the control action, wherein the control action comprises moving the refuse vehicle until the obstacle is no longer detected; and control, after the control action, the lift assembly to move along the second segment.

18. The control system of claim 14, wherein the control action is initiated after the lift assembly traverses the first segment.

19. A method for controlling a refuse vehicle, the method comprising:

detecting, using one or more sensors coupled to a chassis of the refuse vehicle, an obstacle within a trajectory of a lift assembly coupled to the chassis of the refuse vehicle, wherein the trajectory comprises a first segment between the refuse vehicle and a refuse container and a second segment between the refuse container and a refuse compartment coupled to the chassis; and initiating, when the obstacle is detected in the second segment of the trajectory, a control action comprising at least one of controlling the movement of the refuse vehicle, controlling the movement of the lift assembly, or generating an alert.

20. The method of claim 19, further comprising:

controlling one or more actuators to move the lift assembly along the first segment and engage with the refuse container;

initiating, after the refuse container is engaged, the control action; and controlling, after the control action, the one or more actuators to move the lift assembly along the second segment.

* * * * *